United States Patent
Toshiyuki

(10) Patent No.: US 10,305,367 B2
(45) Date of Patent: May 28, 2019

(54) POWER CONVERSION CIRCUIT

(71) Applicant: TOYOTA JIDOSHA KABUSHIKI KAISHA, Toyota-shi, Aichi (JP)

(72) Inventor: Ken Toshiyuki, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/134,456

(22) Filed: Sep. 18, 2018

(65) Prior Publication Data
US 2019/0089239 A1 Mar. 21, 2019

(30) Foreign Application Priority Data
Sep. 20, 2017 (JP) ................. 2017-180579

(51) Int. Cl.
*H02M 1/08* (2006.01)
*H02M 7/5387* (2007.01)
*H02M 3/158* (2006.01)
*H02M 1/00* (2006.01)

(52) U.S. Cl.
CPC ........... *H02M 1/083* (2013.01); *H02M 3/158* (2013.01); *H02M 7/53871* (2013.01); *H02M 2001/0058* (2013.01)

(58) Field of Classification Search
CPC . H02M 2001/0003; H02M 2001/0009; H02M 1/083; H02M 3/155; H02M 3/156; H02M 3/158; H02M 3/1584; H02M 2003/1586; H02M 7/12; H02M 7/155; H02M 7/162; H02M 7/1623; H02M 7/21; H02M 7/217; H02M 7/219; H02M 7/538; H02M 7/53871
See application file for complete search history.

(56) References Cited

U.S. PATENT DOCUMENTS

| 7,646,182 | B2 * | 1/2010 | Nakabayashi | ........ H02M 3/158 323/272 |
| 2012/0229061 | A1 * | 9/2012 | Itoh | ........ B60L 3/003 318/400.3 |
| 2015/0084422 | A1 * | 3/2015 | Ishigaki | ........ H01F 27/38 307/43 |

(Continued)

FOREIGN PATENT DOCUMENTS

JP 2001-186768 A 7/2001

*Primary Examiner* — Emily P Pham
*Assistant Examiner* — Shahzeb K Ahmad
(74) *Attorney, Agent, or Firm* — Hunton Andrews Kurth LLP/HAK

(57) ABSTRACT

A power conversion circuit may include a first FET and a first diode connected in series between a second high potential wiring and a low potential wiring and a second FET and a second diode connected in series between the second high potential wiring and the low potential wiring. A main reactor may be connected to a first high potential wiring. A first sub-reactor may be connected between the main reactor and the first FET. A second sub-reactor may be connected between the main reactor and the second FET. First, second, third, and fourth periods repeatedly may appear in this order. In the third period, a first current flowing through the first sub-reactor decreases to zero after a timing at which the second FET is turned on, and the first FET is turned on after or on a timing at which the first current decreases to zero.

2 Claims, 15 Drawing Sheets

(56) References Cited

U.S. PATENT DOCUMENTS

| | | | |
|---|---|---|---|
| 2015/0138850 A1* | 5/2015 | Pan | H02M 1/4208 363/37 |
| 2015/0311831 A1* | 10/2015 | Yamada | H02J 7/0063 318/139 |
| 2016/0156274 A1* | 6/2016 | Miura | H02M 3/33561 363/17 |
| 2016/0181933 A1* | 6/2016 | James | B60L 11/1816 363/17 |
| 2017/0310212 A1* | 10/2017 | Higaki | G05F 1/38 |
| 2018/0175743 A1* | 6/2018 | Mizokami | H02M 7/53803 |
| 2018/0294740 A1* | 10/2018 | Takagi | H02M 7/219 |

\* cited by examiner

POWER CONVERSION CIRCUIT

INCORPORATION BY REFERENCE

The disclosure of Japanese Patent Application No. 2017-180579 filed on Sep. 20, 2017, including the specification, drawings and abstract is incorporated herein by reference in its entirety.

TECHNICAL FIELD

A technology disclosed herein relates to a power conversion circuit.

BACKGROUND

Japanese Patent Application Publication No. 2001-186768 describes a DC-DC converter that boosts a voltage supplied from a direct current source and outputs the boosted voltage. This DC-DC converter includes a low potential wiring, a first high potential wiring (an input-side high potential wiring), and a second high potential wiring (an output-side high potential wiring). This DC-DC converter further includes two FETs (field effect transistors) of n-channel type, and a source of each of the FETs is connected to the low potential wiring. A drain of the first FET is connected to the second high potential wiring via a first diode. A drain of the second FET is connected to the second high potential wiring via a second diode. Moreover, this DC-DC converter includes a main reactor, a first sub-reactor, and a second sub-reactor. The main reactor includes a first terminal and a second terminal. The first terminal of the main reactor is connected to a diode bridge (a type of a direct current source) via the first high potential wiring. One end of the first sub-reactor is connected to the second terminal of the main reactor, and other end of the first sub-reactor is connected to the drain of the first FET. One end of the second sub-reactor is connected to the second terminal of the main reactor, and other end of the second sub-reactor is connected to the drain of the second FET.

The first and second FETs are controlled so as to be alternately turned on. When the first FET is turned on, a current flows through the first sub-reactor and the first FET. Subsequently, when the first FET is turned off, a current flows through the first diode due to an induced voltage of the first sub-reactor. A voltage of the second high potential wiring is thereby boosted. Moreover, after the first FET is turned off, the second FET is turned on. When the second FET is turned on, the current flowing through the first sub-reactor and the first diode stops, and a current flows through the second sub-reactor and the second FET. Subsequently, when the second FET is turned off, a current flows through the second diode due to an induced voltage of the second sub-reactor. A voltage of the second high potential wiring is thereby boosted. After the second FET is turned off, the first FET is turned on again. When the first FET is turned on, the current flowing through the second sub-reactor and the second diode stops, and a current flows through the first sub-reactor and the first FET. Such alternate turn-on of the first and second FETs boosts the voltage of the second high potential wiring.

Moreover, immediately before the turn-on of the first FET, no current flows through the first sub-reactor. Therefore, after the turn-on of the first FET, the current flowing through the first FET rises gradually. Accordingly, a switching loss at the turn-on of the first FET is suppressed. Moreover, immediately before the turn-on of the second FET, no current flows through the second sub-reactor. Therefore, after the turn-on of the second FET, the current flowing through the second FET rises gradually. Accordingly, a switching loss at the turn-on of the second FET is suppressed. Such a FET switching in a state where a switching loss is less likely to occur may be called soft switching.

SUMMARY

In the technology in Japanese Patent Application Publication No. 2001-186768, the second FET is off when the first FET is on, and the first FET is off when the second FET is on. Accordingly, a current density in each of the first and second FETs is high, so a steady loss that occurs in each of the first and second FETs is large. Although Japanese Patent Application Publication No. 2001-186768 describes the DC-DC converter that boosts a voltage supplied from the direct current source, a similar configuration can also be adopted in an inverter that converts direct current power into alternating current power and a similar problem as the one described above may occur. In an inverter, the main reactor may be a coil of a motor, and the first high potential wiring may be a wiring that supplies power to the motor. The disclosure herein provides a technology that enables soft switching and is capable of suppressing a steady loss that occurs in first and second FETs, in a power conversion circuit such as a DC-DC converter and an inverter.

A power conversion circuit disclosed herein may comprise a first high potential wiring connected to a power source; a second high potential wiring; a low potential wiring; a first FET of n-channel type, a source of the first FET being connected to the low potential wiring; a second FET of n-channel type, a source of the second FET being connected to the low potential wiring; a first diode, an anode of the first diode being connected to a drain of the first FET, and a cathode of the first diode being connected to the second high potential wiring; a second diode, an anode of the second diode being connected to a drain of the second FET, and a cathode of the second diode being connected to the second high potential wiring; a main reactor comprising a first terminal and a second terminal, the first terminal being connected to the first high potential wiring; a first sub-reactor, one end of the first sub-reactor being connected to the second terminal of the main reactor, and other end of the first sub-reactor being connected to the drain of the first FET; a second sub-reactor, one end of the second sub-reactor being connected to the second terminal of the main reactor, and other end of the second sub-reactor being connected to the drain of the second FET; and a gate controller connected to a gate of the first FET and a gate of the second FET. The gate controller may be configured to perform a first operation. In the first operation, the gate controller may control the first FET and the second FET so as to satisfy following conditions: (condition 1) a first period, a second period, a third period, and a fourth period repeatedly appear in this order, the first period being a period in which the first FET is on, the second period being a period in which the first FET and the second FET are off, the third period being a period in which the second FET is on, and the fourth period being a period in which the first FET and the second FET are off; (condition 2) in the third period, a first current flowing through the first sub-reactor decreases to zero after a timing at which the second FET is turned on, and the first FET is turned on after or on a timing at which the first current decreases to zero; and (condition 3) in the first period, a second current flowing through the second sub-reactor decreases to zero after a timing at which the first FET is turned on, and the second FET is turned on after or on a timing at which the second current decreases to zero.

In the disclosure herein, the FET of n-channel type includes an IGBT (an insulated gate bipolar transistor). In an IGBT, a drain may be called a collector, and a source may be called an emitter.

In the first period, immediately before the turn-on of the first FET, no current flows through the first sub-reactor. Therefore, the first FET is soft-switched. Moreover, when the first FET is turned on in the first period, the second current flowing through the second sub-reactor and the second diode decreases to zero because the anode of the second diode is connected to the low potential wiring via the second sub-reactor, the first sub-reactor, and the first FET. In the first period, the second FET is turned on after or on the timing at which the second current flowing through the second sub-reactor decreases to zero. Therefore, the second FET is soft-switched. In the first period, after or on the timing at which the second FET is turned on, a current divides to flow through the first and second FETs, so a current density of the first FET decreases. Accordingly, a steady loss that occurs in the first FET is suppressed.

In the third period, immediately before the turn-on of the second FET, no current flows through the second sub-reactor. Therefore, the second FET is soft-switched. Moreover, when the second FET is turned on in the third period, the first current flowing through the first sub-reactor and the first diode decreases to zero because the anode of the first diode is connected to the low potential wiring via the first sub-reactor, the second sub-reactor, and the second FET. In the third period, the first FET is turned on after or on the timing at which the first current flowing through the first sub-reactor decreases to zero. Therefore, the first FET is soft-switched. In the third period, after or on the timing at which the first FET is turned on, a current divides to flow through the first and second FETs, so a current density of the second FET decreases. Accordingly, a steady loss that occurs in the second FET is suppressed.

As such, according to this power conversion circuit, it is possible to suppress steady loss that occurs in the first and second FETs while soft-switching the first and second FETs.

DETAILED DESCRIPTION

First Embodiment

Figure 1:
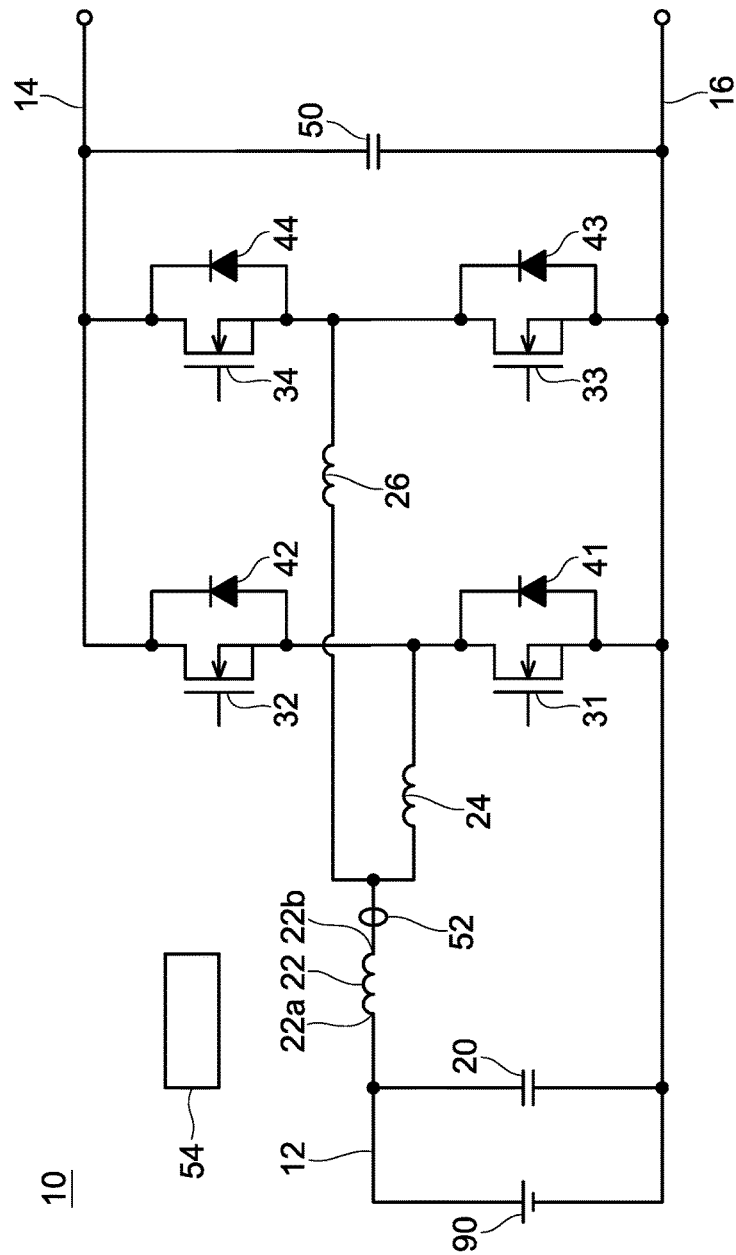
FIG. 1 is a circuit diagram of a DC-DC converter.

FIG. 1 illustrates a circuit diagram of a DC-DC converter 10 in a first embodiment. The DC-DC converter 10 is mounted on a vehicle. The DC-DC converter 10 comprises a high potential input wiring 12, a high potential output wiring 14, and a low potential wiring 16. The high potential input wiring 12 is connected to a positive electrode of a direct current source 90 (e.g., a battery). The low potential wiring 16 is connected to a negative electrode of the direct current source 90. The DC-DC converter 10 boosts an applied voltage of the direct current source 90 (i.e., a voltage between the high potential input wiring 12 and the low potential wiring 16), and applies the boosted voltage between the high potential output wiring 14 and the low potential wiring 16. Although not illustrated, a load (e.g., an inverter or a drive motor) is connected between the high potential output wiring 14 and the low potential wiring 16. Therefore, the boosted voltage is supplied to the load.

The DC-DC converter 10 comprises an input-side smoothing capacitor 20, a main reactor 22, a first sub-reactor 24, a second sub-reactor 26, MOSFETs 31 to 34, diodes 41 to 44, an output-side smoothing capacitor 50, a current sensor 52, and a gate controller 54.

The input-side smoothing capacitor 20 is connected between the high potential input wiring 12 and the low potential wiring 16.

Each of the MOSFETs 31, 32, 33, 34 is a MOSFET of n-channel type. The MOSFET 31 and the MOSFET 32 are connected in series between the high potential output wiring 14 and the low potential wiring 16. A source of the MOSFET 31 is connected to the low potential wiring 16. A drain of the MOSFET 31 is connected to a source of the MOSFET 32. A drain of the MOSFET 32 is connected to the high potential output wiring 14. The diode 41 is connected in parallel to the MOSFET 31. An anode of the diode 41 is connected to the source of the MOSFET 31. A cathode of the diode 41 is connected the drain of the MOSFET 31. The diode 42 is connected in parallel to the MOSFET 32. An anode of the diode 42 is connected to the source of the MOSFET 32. A cathode of the diode 42 is connected to the drain of the MOSFET 32.

The MOSFET 33 and the MOSFET 34 are connected in series between the high potential output wiring 14 and the low potential wiring 16. A source of the MOSFET 33 is connected to the low potential wiring 16. A drain of the MOSFET 33 is connected to a source of the MOSFET 34. A drain of the MOSFET 34 is connected to the high potential output wiring 14. The diode 43 is connected in parallel to the MOSFET 33. An anode of the diode 43 is connected to the source of the MOSFET 33. A cathode of the diode 43 is connected to the drain of the MOSFET 33. The diode 44 is connected in parallel to the MOSFET 34. An anode of the diode 44 is connected to the source of the MOSFET 34. A cathode of the diode 44 is connected to the drain of the MOSFET 34.

It should be noted that a MOSFET that has its source connected to the low potential wiring 16 (i.e., the MOSFETs 31, 33) will hereinafter be referred to as a lower MOSFET, and a MOSFET that has its drain connected to the high potential output wiring 14 (i.e., the MOSFETs 32, 34) will hereinafter be referred to as an upper MOSFET.

The main reactor 22 includes a first terminal 22a and a second terminal 22b. The first terminal 22a is connected to the high potential input wiring 12. The main reactor 22 includes a structure in which a wire is wound plural times around a core constituted of a high magnetic permeability material.

One end of the first sub-reactor 24 is connected to the second terminal 22b of the main reactor 22. Other end of the first sub-reactor 24 is connected to the drain of the lower MOSFET 31 and the source of the upper MOSFET 32. An inductance of the first sub-reactor 24 is smaller than an inductance of the main reactor 22.

One end of the second sub-reactor 26 is connected to the second terminal 22b of the main reactor 22. Other end of the second sub-reactor 26 is connected to the drain of the lower MOSFET 33 and the source of the upper MOSFET 34. An inductance of the second sub-reactor 26 is smaller than the inductance of the main reactor 22.

It should be noted that each of the first sub-reactor 24 and the second sub-reactor 26 may include a structure in which a wire is wound around a core, or may include a structure in which a high magnetic permeability material covers a wiring.

The output-side smoothing capacitor 50 is connected between the high potential output wiring 14 and the low potential wiring 16.

The current sensor 52 detects a current flowing through the main reactor 22. The current sensor 52 transmits a value of the detected current to the gate controller 54.

The gate controller 54 is connected to each of gates of the MOSFETs 31 to 34. The gate controller 54 includes, for each MOSFET, a driving circuit that charges/discharges the corresponding gate. Moreover, the gate controller 54 includes a control circuit that transmits a signal for instructing each driving circuit to turn on or turn off the corresponding MOSFET. The gate controller 54 can control the MOSFETs 31 to 34 independently.

Figure 2:
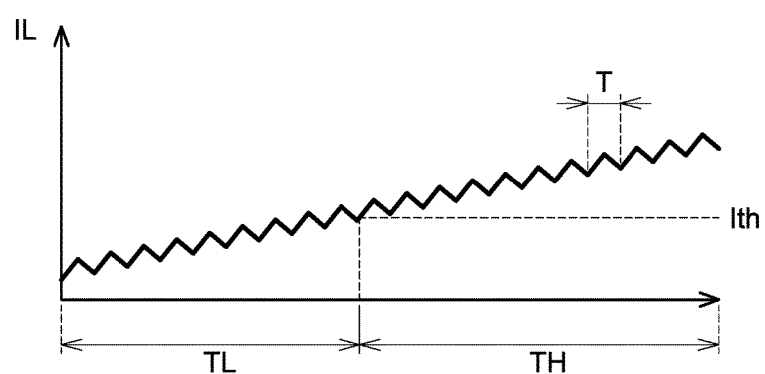
FIG. 2 is a graph illustrating changes in current IL.

Next, an operation of the DC-DC converter 10 will be described. FIG. 2 illustrates changes in a current IL flowing through the main reactor 22 relative to time. The current IL periodically fluctuates by the MOSFETs 31 to 34 being switched. Moreover, the current IL fluctuates over a long term due to power consumption and the like in the load (i.e., the drive motor or the like). FIG. 2 illustrates a case where the current IL gradually increases while periodically fluctuating. It should be noted, although FIG. 2 illustrates a fluctuation cycle T of the current IL as being relatively long, the fluctuation cycle T is actually much shorter than that in FIG. 2. The gate controller 54 performs a first operation and a second operation based on the current IL. The gate controller 54 performs the first operation in a state where the current IL is lower than a threshold value Ith in at least a part of the fluctuation cycle T of the current IL (a period TL in FIG. 2), and performs the second operation in a state where the current IL is constantly equal to or higher than the threshold value Ith during the fluctuation cycle T (a period TH in FIG. 2).

Figure 3:
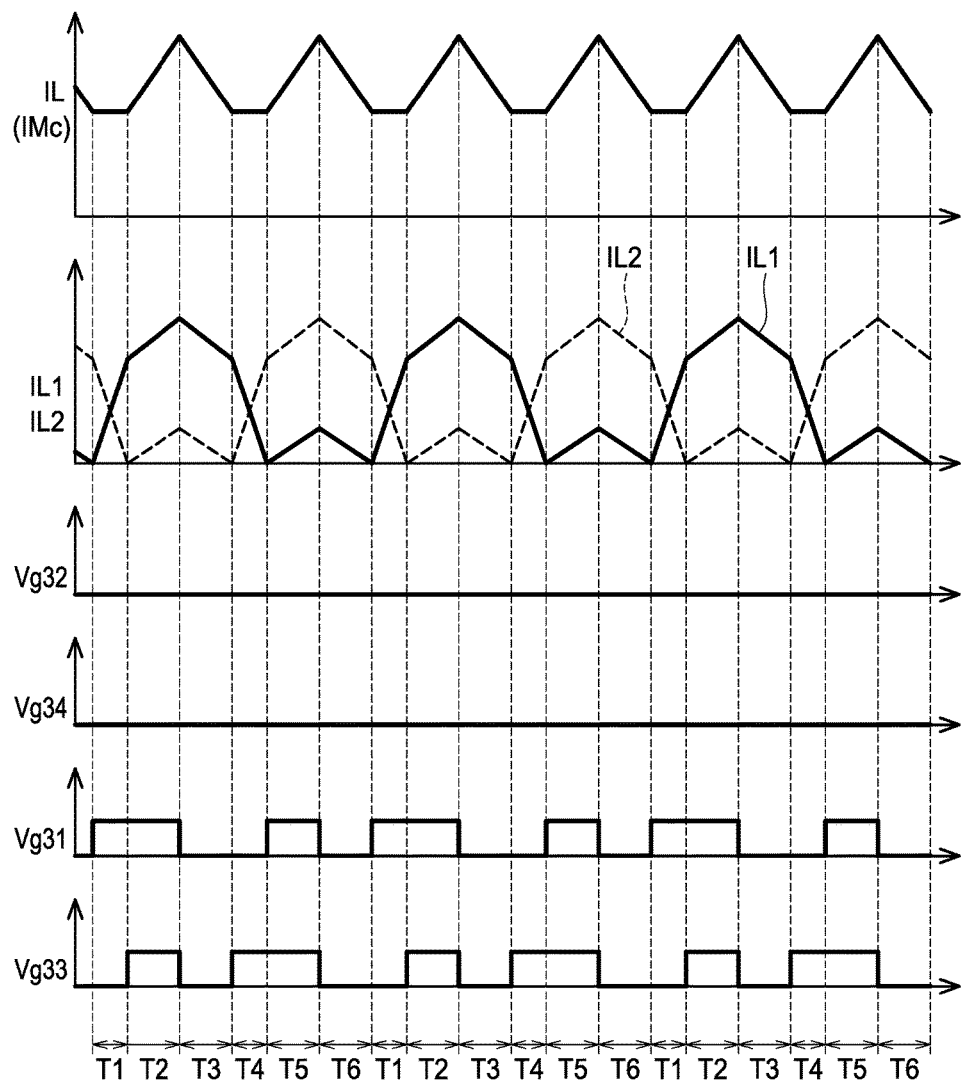
FIG. 3 is a graph illustrating changes in respective values in a first operation.
Figure 4:
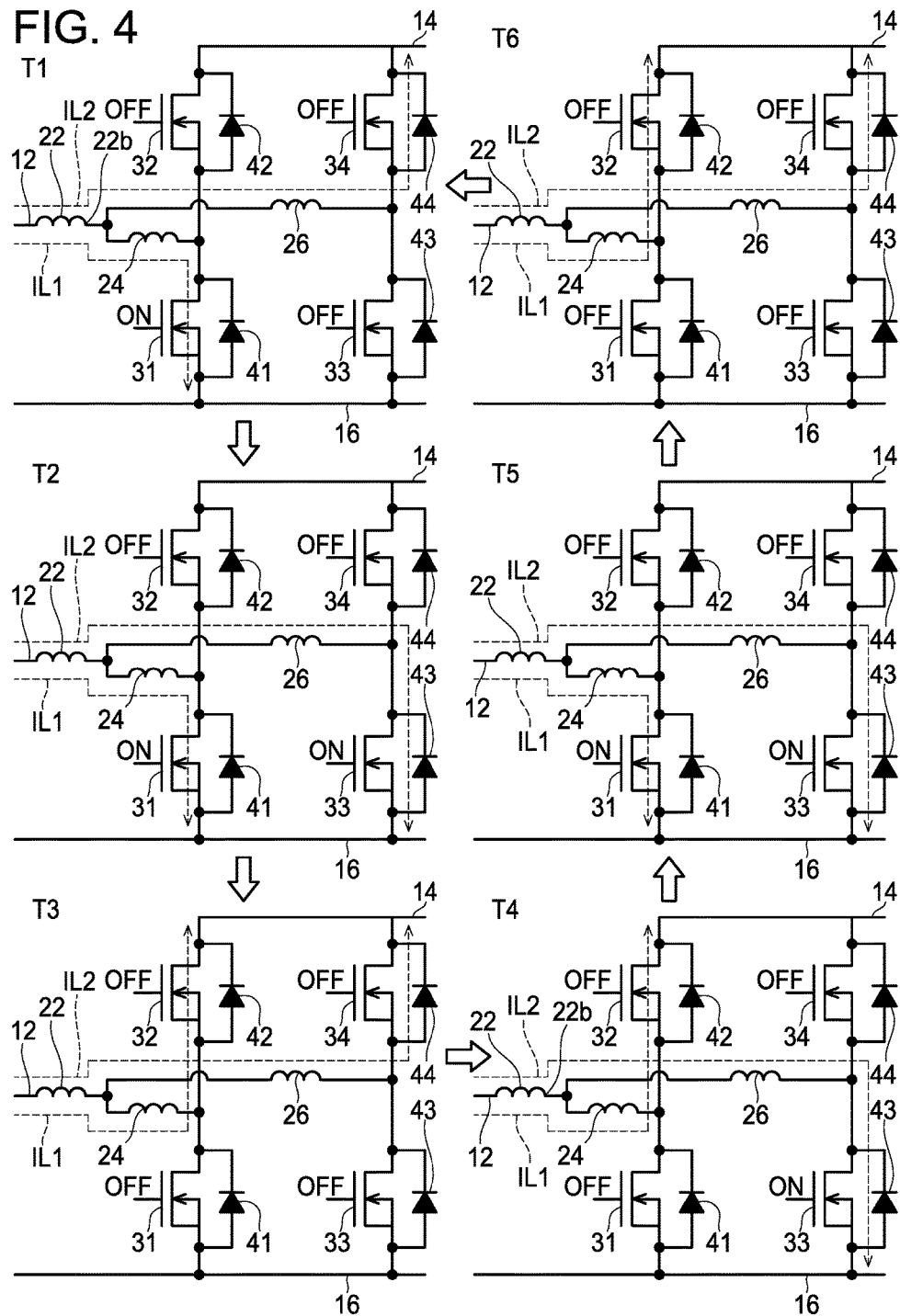
FIG. 4 is a diagram illustrating changes in a state of the DC-DC converter in the first operation
Figure 5:
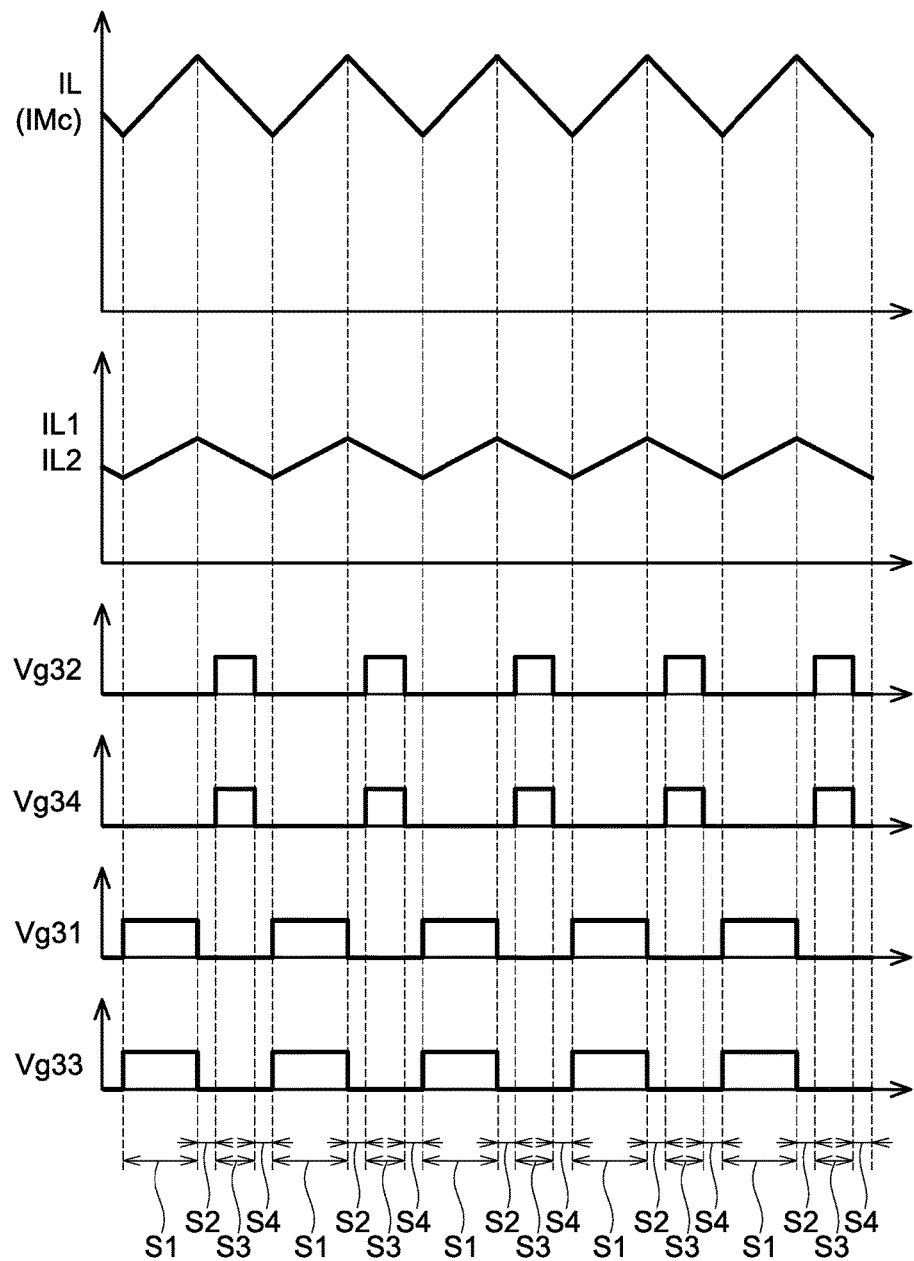
FIG. 5 is a graph illustrating changes in respective values in a second operation.
Figure 6:
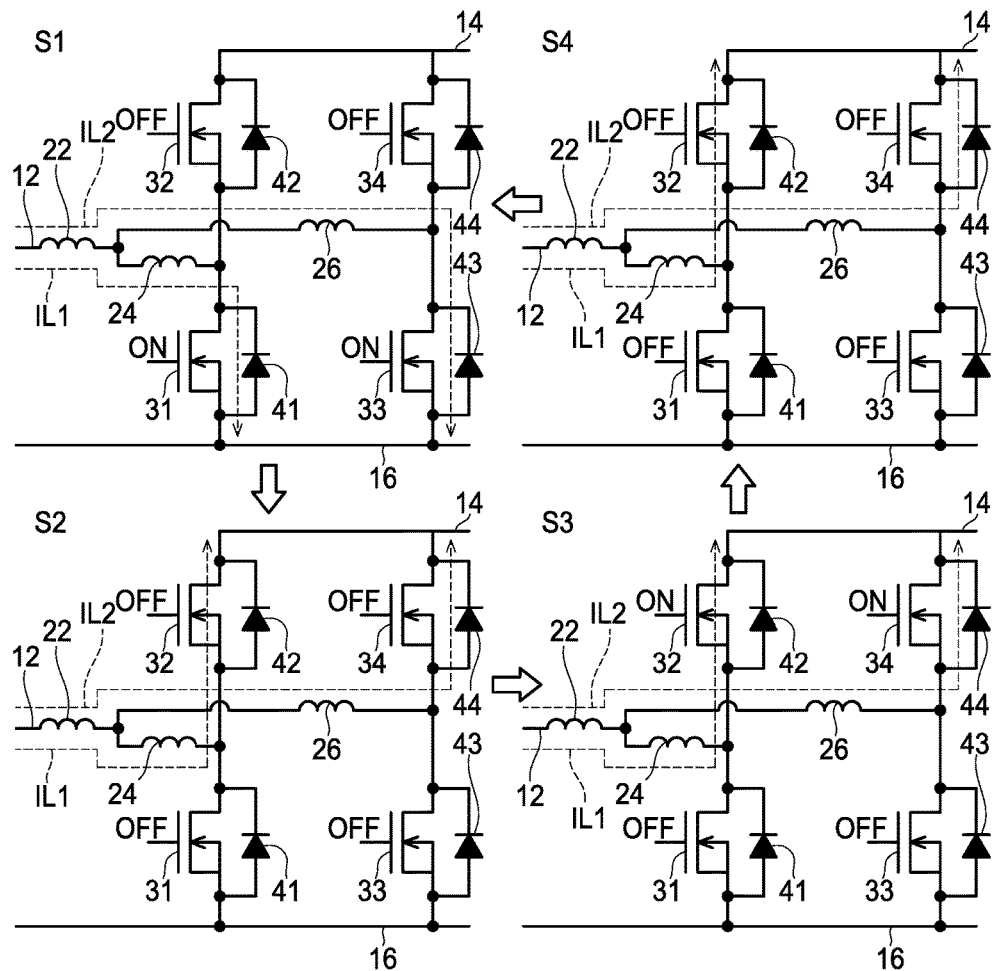
FIG. 6 is a diagram illustrating changes in the state of the DC-DC converter in the second operation.

FIG. 3 is a graph illustrating changes in respective values in the first operation. Moreover, FIG. 5 is a graph illustrating changes in the respective values in the second operation. In FIGS. 3, 5, and the other drawings, a current IL1 is a current flowing through the first sub-reactor 24, and a current IL2 is a current flowing through the second sub-reactor 26. It should be noted, in FIG. 5, the current IL1 coincides with the current IL2 (i.e., graphs are overlaid). Moreover, the current IL represents a total value of the current IL1 and the current IL2. Moreover, in FIGS. 3, 5, and the other drawings, a potential Vg31 is a gate potential of the lower MOSFET 31, a potential Vg32 is a gate potential of the upper MOSFET 32, a potential Vg33 is a gate potential of the lower MOSFET 33, and a potential Vg34 is a gate potential of the upper MOSFET 34. The gate potentials Vg31 to Vg34 are controlled by the gate controller 54. The gate potentials Vg31 to Vg34 change between a high potential and a low potential. Each MOSFET is brought into an on state when its gate potential is high, and is brought into an off state when its gate potential is low. Moreover, FIG. 4 illustrates changes in a state of the DC-DC converter 10 in the first operation. FIG. 6 illustrates changes in the state of the DC-DC converter 10 in the second operation. It should be noted that each of FIGS. 4 and 6 illustrates the circuit configuration of the DC-DC converter 10 in a more simplified manner than FIG. 1 does.

Initially, the first operation will be described. As illustrated in FIG. 3, in the first operation, the gate controller 54 controls the state of the DC-DC converter 10 so as to be changed from a state T1 to a state T2, a state T3, a state T4, a state T5, and a state T6 in this order, and then return to the state T1. In other words, the gate controller 54 performs control such that a cycle of the states T1 to T6 is repeated. FIG. 4 illustrates each of the states T1 to T6.

As illustrated in FIGS. 3 and 4, in the first operation, the upper MOSFET 32 and the upper MOSFET 34 are controlled to be constantly in the off state.

In the state T1, the lower MOSFET 31 is on, and the lower MOSFET 33 is off. Since the lower MOSFET 31 is on in the state T1, the current IL1 flows from the high potential input wiring 12 to the low potential wiring 16 through the main reactor 22, the first sub-reactor 24, and the lower MOSFET 31. During a period of the state T1, an induced voltage of the first sub-reactor 24 (an induced voltage that acts in a direction opposing the current IL1) decreases, so the current IL1 rapidly increases during the period of the state T1. Moreover, although described later in detail, in the state T1, the current IL2 flows from the high potential input wiring 12 to the high potential output wiring 14 through the main reactor 22, the second sub-reactor 26, and the diode 44 due to an induced voltage of the second sub-reactor 26. However, the current IL2 rapidly decreases during the period of the state T1. Therefore, the current IL hardly changes during the period of the state T1. When the current IL2 decreases to zero in the state T1, the state T2 starts.

In the state T2, the lower MOSFET 31 is maintained in the on state, and the current IL1 continues flowing. During a period of the state T2, an induced voltage of the main reactor 22 and the induced voltage of the first sub-reactor 24 (induced voltages that act in the direction opposing the current IL1) decrease, so the current IL1 gradually increases during the period of the state T2.

Moreover, the lower MOSFET 33 is turned on after or on a timing at which the current IL2 decreases to zero in the state T1 (i.e., an initial timing of the period of the state T2). Accordingly, in the state T2, the current IL2 starts flowing from the high potential input wiring 12 to the low potential wiring 16 through the main reactor 22, the second sub-reactor 26, and the lower MOSFET 33. Since the current IL2 flowing through the second sub-reactor 26 is zero immediately before the timing at which the lower MOSFET 33 is turned on, a current flowing through the lower MOSFET 33 at the turn-on of the lower MOSFET 33 (i.e., the current IL2) does not increase rapidly. Accordingly, a switching loss that occurs at the turn-on of the lower MOSFET 33 is small. In other words, the lower MOSFET 33 is soft-switched. During the period of the state T2, the induced voltage of the main reactor 22 and the induced voltage of the second sub-reactor 26 (induced voltages that act in a direction opposing the current IL2) decrease, so the current IL2 gradually increases during the period of the state T2. Since the current IL2 rises from zero in the state T2, the current IL2 is smaller than the current IL1 during the period of the state T2.

As described above, during the period of the state T2, both of the current IL1 and the current IL2 increase, and hence the current IL increases. During the period of the state T2, the current IL divides to flow through the lower MOSFET 31 and the lower MOSFET 33. Accordingly, a steady loss that occurs in the lower MOSFETs 31, 33 can be reduced as compared to a case where only the lower MOSFET 31 is turned on (i.e., a case where the current IL flows only through the lower MOSFET 31). At an end of the period of the state T2, the lower MOSFET 31 and the lower MOSFET 33 are switched from the on state to the off state. The DC-DC converter 10 thereby transitions from the state T2 to the state T3.

When the lower MOSFET 31 is turned off at a start of a period of the state T3, the main reactor 22 and the first sub-reactor 24 generate induced voltages in a direction along which the current IL1 is kept flowing, so a potential of the anode of the diode 42 rises. Accordingly, the current IL1 flows from the high potential input wiring 12 to the high potential output wiring 14 through the main reactor 22, the first sub-reactor 24, and the diode 42. During the period of the state T3, the induced voltages of the main reactor 22 and the first sub-reactor 24 (induced voltages that act in the direction along which the current IL1 flows) decrease, so the current IL1 gradually decreases during the period of the state T3.

Moreover, when the lower MOSFET 33 is turned off at the start of the period of the state T3, the main reactor 22 and the second sub-reactor 26 generate induced voltages in a direction along which the current IL2 is kept flowing, so a potential of the anode of the diode 44 rises. Accordingly, the current IL2 flows from the high potential input wiring 12 to the high potential output wiring 14 through the main reactor 22, the second sub-reactor 26, and the diode 44. During the period of the state T3, the induced voltages of the main reactor 22 and the second sub-reactor 26 (induced voltages that acts in the direction along which the current IL2 flows) decrease, so the current IL2 gradually decreases during the period of the state T3.

As described above, during the period of the state T3, both of the current IL1 and the current IL2 decrease, and hence the current IL decreases. Due to the currents IL1, IL2 flowing to the high potential output wiring 14 during the period of the state T3, the output-side smoothing capacitor 50 (see FIG. 1) is charged, and a potential of the high potential output wiring 14 is raised. In the state T3, the current IL divides to flow through the diode 42 and the diode 44. Accordingly, a steady loss that occurs in the diodes 42, 44 can be reduced as compared to a case where the current IL flows only through the diode 42. During the period of the state T3, the current IL2 decreases to zero. On a timing at which the current IL2 decreases to zero, the current IL1 still has a high value. At an end of the period of the state T3 (i.e., after or on the timing at which the current IL2 decreases to zero), the lower MOSFET 33 is switched from the off state to the on state. The DC-DC converter 10 thereby transitions from the state T3 to the state T4.

Since the lower MOSFET 33 is turned on in the state T4, the current IL2 flows from the high potential input wiring 12 to the low potential wiring 16 through the main reactor 22, the second sub-reactor 26, and the lower MOSFET 33. During a period of the state T4, the induced voltage generated by the second sub-reactor 26 (induced voltage that acts in the direction opposing the current IL2) decreases, so the current IL2 increases during the period of the state T4. Immediately before the timing at which the lower MOSFET 33 is turned on at a start of the period of the state T4, the current IL2 flowing through the second sub-reactor 26 is zero. Therefore, when the lower MOSFET 33 is turned on, a current flowing through the lower MOSFET 33 (i.e., the current IL2) does not increase excessively. The current IL2 rapidly increases, but not to an excessive extent. Since the current IL2 does not increase at an excessively high rate, a switching loss that occurs at the turn-on of the lower MOSFET 33 is small. In other words, the lower MOSFET 33 is soft-switched. Moreover, during the period of the state T4, the current IL1 continues flowing via the diode 42 as in the period of the state T3. However, in the period of the state T4, the current IL1 rapidly decreases because a potential of the second terminal 22b of the main reactor 22 rapidly decreases due to the turn-on of the lower MOSFET 33. Therefore, in the state T4, the current IL hardly changes. When the current IL1 decreases to zero, the state T5 starts.

In the state T5, the lower MOSFET 33 is maintained in the on state, and the current IL2 continues flowing. During a period of the state T5, the induced voltage of the main reactor 22 and the induced voltage of the second sub-reactor 26 (induced voltages that act in the direction opposing the current IL2) decrease, so the current IL2 gradually increases during the period of the state T5.

Moreover, the lower MOSFET 31 is turned on after or on a timing at which the current IL1 decreases to zero in the state T4 (i.e., an initial timing of the period of the state T5). Accordingly, in the state T5, the current IL1 starts flowing from the high potential input wiring 12 to the low potential wiring 16 through the main reactor 22, the first sub-reactor 24, and the lower MOSFET 31. Immediately before the timing at which the lower MOSFET 31 is turned on, the current IL1 flowing through the first sub-reactor 24 is zero, so a current flowing through the lower MOSFET 31 at the turn-on of the lower MOSFET 31 (i.e., the current IL1) does not increase rapidly. Accordingly, a switching loss that occurs at the turn-on of the lower MOSFET 31 is small. In other words, the lower MOSFET 31 is soft-switched. During the period of the state T5, the induced voltage of the main reactor 22 and the induced voltage of the first sub-reactor 24 (induced voltages that act in the direction opposing the current IL1) decrease, so the current IL1 gradually increases during the period of the state T5. Since the current IL1 rises from zero in the state T5, the current IL1 is smaller than the current IL2 during the period of the state T5.

As described above, during the period of the state T5, both of the current IL1 and the current IL2 increase, and hence the current IL increases. During the period of the state T5, the current IL divides to flow through the lower MOSFET 31 and the lower MOSFET 33. Accordingly, a steady loss that occurs in the lower MOSFETs 31, 33 can be reduced as compared to a case where only the lower MOSFET 33 is turned on (i.e., a case where the current IL flows only through the lower MOSFET 33). At an end of the period of the state T5, the lower MOSFET 31 and the lower MOSFET 33 are switched from the on state to the off state. The DC-DC converter 10 thereby transitions from the state T5 to the state T6.

When the lower MOSFET 33 is turned off at a start of a period of the state T6, the main reactor 22 and the second sub-reactor 26 generate induced voltages in the direction along which the current IL2 is kept flowing, so the potential of the anode of the diode 44 rises. Accordingly, the current IL2 flows from the high potential input wiring 12 to the high potential output wiring 14 through the main reactor 22, the second sub-reactor 26, and the diode 44. During the period of the state T6, the induced voltages of the main reactor 22 and the second sub-reactor 26 (induced voltages that act in the direction along which the current IL2 flows) decrease, so the current IL2 gradually decreases during the period of the state T6.

Moreover, when the lower MOSFET 31 is turned off at the start of the period of the state T6, the main reactor 22 and the first sub-reactor 24 generate induced voltages in the direction along which the current IL1 is kept flowing, so the potential of the anode of the diode 42 rises. Accordingly, the current IL1 flows from the high potential input wiring 12 to the high potential output wiring 14 through the main reactor 22, the first sub-reactor 24, and the diode 42. During the period of the state T6, the induced voltages of the main reactor 22 and the first sub-reactor 24 (induced voltages that act in the direction along which the current IL1 flows) decrease, so the current IL1 gradually decreases during the period of the state T6.

As described above, during the period of the state T6, both of the current IL1 and the current IL2 decrease, and hence the current IL decreases. Due to the currents IL1, IL2 flowing to the high potential output wiring 14 during the period of the state T6, the output-side smoothing capacitor 50 (see FIG. 1) is charged, and the potential of the high potential output wiring 14 is raised. In the state T6, the current IL divides to flow through the diode 42 and the diode 44. Accordingly, a steady loss that occurs in the diodes 42, 44 can be reduced as compared to a case where the current IL flows only through the diode 44. During the period of the state T6, the current IL1 decreases to zero. On a timing at which the current IL1 decreases to zero, the current IL2 still has a high value. At an end of the period of the state T6 (i.e., after or on the timing at which the current IL1 decreases to zero), the lower MOSFET 31 is switched from the off state to the on state. The DC-DC converter 10 thereby transitions from the state T6 to the state T1.

Since the lower MOSFET 31 is turned on in the state T1, the current IL1 flows from the high potential input wiring 12 to the low potential wiring 16 through the main reactor 22, the first sub-reactor 24, and the lower MOSFET 31 as mentioned above. During the period of the state T1, the induced voltage of the first sub-reactor 24 (induced voltage that acts in the direction opposing the current IL1) decreases, so the current IL1 rapidly increases during the period of the state T1. At the start of the period of the state T1 and immediately before the timing at which the lower MOSFET 31 is turned on, the current IL1 flowing through the first sub-reactor 24 is zero. Therefore, when the lower MOSFET 31 is turned on, a current flowing through the lower MOSFET 31 (i.e., the current IL1) does not increase excessively. The current IL1 rapidly increases, but not to an excessive extent. Since the current IL1 does not increase at an excessively high rate, a switching loss that occurs at the turn-on of the lower MOSFET 31 is small. In other words, the lower MOSFET 31 is soft-switched. Moreover, during the period of the state T1, the current IL2 continues flowing via the diode 44 as in the period of the state T6. However, in the period of the state T1, the current IL2 rapidly decreases because the potential of the second terminal 22b of the main reactor 22 rapidly decreases due to the turn-on of the lower MOSFET 31. Therefore, in the state T1, the current IL hardly changes.

As described above, in the first operation, the cycle of the states T1 to T6 is repeated plural times. Due to this, the current IL periodically fluctuates, and the potential of the high potential output wiring 14 rises.

It should be noted, in the first operation mentioned above, the upper MOSFETs 32, 34 are constantly off. However, the upper MOSFET 32 may be on in a part of the period in which the current IL1 flows through the diode 42. Moreover, the upper MOSFET 34 may be on in a part of the period in which the current IL2 flows through the diode 44. Such turn-on of the upper MOSFETs 32, 34 that are connected in parallel to the diodes 42, 44 can further divide the currents flowing through the diodes 42, 44. Due to this, a steady loss that occurs in the diodes 42, 44 can further be suppressed.

Next, the second operation will be described. As illustrated in FIG. 5, in the second operation, the gate controller 54 controls the state of the DC-DC converter 10 so as to be changed from a state S1 to a state S2, a state S3, and a state S4 in this order, and then return to the state S1. In other words, the gate controller 54 performs control such that a cycle of the states S1 to S4 is repeated. FIG. 6 illustrates each of the states S1 to S4.

In the state S1, the lower MOSFET 31 and the lower MOSFET 33 are on, and the upper MOSFET 32 and the upper MOSFET 34 are off. Accordingly, the current IL1 flows from the high potential input wiring 12 to the low potential wiring 16 through the main reactor 22, the first sub-reactor 24, and the lower MOSFET 31, and additionally, the current IL2 flows from the high potential input wiring 12 to the low potential wiring 16 through the main reactor 22, the second sub-reactor 26, and the lower MOSFET 33. During a period of the state S1, the induced voltages of the respective reactors (induced voltages that act in the direction opposing the current IL1 and in the direction opposing the current IL2) gradually decrease, so the currents IL1, IL2 gradually increase. Therefore, the current IL gradually increases. At an end of the period of the state S1, the lower MOSFET 31 and the lower MOSFET 33 are switched from the on state to the off state. The DC-DC converter 10 thereby transitions from the state S1 to the state S2.

When the lower MOSFET 31 and the lower MOSFET 33 are turned off at a start of a period of the state S2, the main reactor 22 and the first sub-reactor 24 generate induced voltages in the direction along which the current IL1 is kept flowing, and the main reactor 22 and the second sub-reactor 26 generate induced voltages in the direction along which the current IL2 is kept flowing. Since the induced voltages of the main reactor 22 and the first sub-reactor 24 raise the potential of the anode of the diode 42, the current IL1 flows through the diode 42. In other words, the current IL1 flows from the high potential input wiring 12 to the high potential output wiring 14 through the main reactor 22, the first sub-reactor 24, and the diode 42. Moreover, since the induced voltages of the main reactor 22 and the second sub-reactor 26 raise the potential of the anode of the diode 44, the current IL2 flows through the diode 44. In other words, the current IL2 flows from the high potential input wiring 12 to the high potential output wiring 14 through the main reactor 22, the second sub-reactor 26, and the diode 44. Due to the currents IL1, IL2 flowing as such, the output-side smoothing capacitor 50 (see FIG. 1) is charged, and the potential of the high potential output wiring 14 is raised. At an end of the period of the state S2, the upper MOSFET 32 and the upper MOSFET 34 are switched from the off state to the on state. The DC-DC converter 10 thereby transitions from the state S2 to the state S3.

In the state S3 as well, the current IL1 flows via the diode 42, and the current IL2 flows via the diode 44. Moreover, due to the turn-on of the upper MOSFET 32, the current IL1 divides to flow through the upper MOSFET 32 and the diode 42. Due to this, a steady loss caused by the current IL1 flowing is reduced. Moreover, due to the turn-on of the upper MOSFET 34, the current IL2 divides to flow through the upper MOSFET 34 and the diode 44. Due to this, a steady loss caused by the current IL2 flowing is reduced. At an end of a period of the state S3, the upper MOSFET 32 and the upper MOSFET 34 are switched from the on state to the off state. The DC-DC converter 10 thereby transitions from the state S3 to the state S4.

In the state S4 as well, as in the state S2, the current IL1 flows via the diode 42, and the current IL2 flows via the diode 44. At an end of a period of the state S4, the lower MOSFET 31 and the lower MOSFET 33 are switched from the off state to the on state. The DC-DC converter 10 thereby transitions from the state S4 to the state S1.

It should be noted, during the periods of the states S2, S3, and S4, the induced voltages of the respective reactors (induced voltages that act in the direction along which the current IL1 flows and in the direction along which the current IL2 flows) gradually decrease, so the currents IL1, IL2 gradually decrease. In other words, the current IL gradually decreases. By repetition of the states S1 to S4, the current IL periodically fluctuates.

As described above, in the second operation, the state (the state S1) where the lower MOSFETs 31, 33 are on and the state (the states S2, S3, S4) where the lower MOSFETs 31, 33 are off are alternately repeated. The potential of the high potential output wiring 14 can thereby be raised.

It should be noted, in the second operation mentioned above, the upper MOSFETs 32, 34 are on in a part of the period in which a current flows through the diodes 42, 44. However, in the second operation, the upper MOSFETs 32, 34 may be constantly maintained to be off. However, the upper MOSFETs 32, 34 can be on in a part of the period in which a current flows through the diodes 42, 44 because an effect of suppressing a steady loss by a current division can be obtained.

Figure 7:
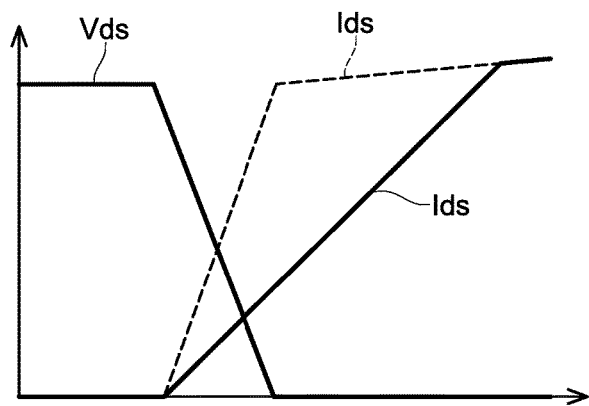
FIG. 7 is a graph illustrating changes in current and voltage at turn-on of a MOSFET.

Next, the soft switching will be described in further detail. FIG. 7 illustrates changes in a drain-source voltage Vds and a drain-source current Ids at the turn-on of the lower MOSFETs 31, 33. It should be noted that a graph of the current Ids in a solid line in FIG. 7 illustrates change in the current Ids when the lower MOSFET 31 is turned on at the start of the period of the state T1 in the first operation and when the lower MOSFET 33 is turned on at the start of the period of the state T4 in the first operation. A graph of the current Ids in a dashed line in FIG. 7 illustrates change in the current Ids when the lower MOSFETs 31, 33 are turned on in the second operation. In both of the first and second operations, when the lower MOSFETs 31, 33 are turned on, the voltage Vds decreases and the current Ids increases.

In the second operation, as illustrated in FIG. 5, in the state (the state S4) immediately before the turn-on of the lower MOSFET 31, the current IL1 flows through the main reactor 22 and the first sub-reactor 24. Accordingly, at approximately the same time as the turn-on of the lower MOSFET 31, the current IL1 flows into the lower MOSFET 31 from the reactors 22, 24. Accordingly, as illustrated by the graph of the current Ids in the dashed line in FIG. 7, the current Ids increases at a high rate at the turn-on of the lower MOSFET 31 in the second operation. Therefore, in the second operation, a loss (a switching loss) that occurs at the turn-on of the lower MOSFET 31 is large. Similarly, in the second operation, a switching loss that occurs at the turn-on of the lower MOSFET 33 is large.

On the other hand, in the first operation, as illustrated in FIG. 3, in the state immediately before the lower MOSFET 31 is turned on (at the end of the period of the state T6) at the start of the period of the state T1, the current IL1 does not flow through the first sub-reactor 24. Accordingly, the current IL1 starts flowing through the lower MOSFET 31 at the same time as the turn-on of the lower MOSFET 31, and a rate at which the current IL1 increases is not so high. Accordingly, as illustrated by the graph of the current Ids in the solid line in FIG. 7, the current Ids increases at the turn-on of the lower MOSFET 31 at a lower rate in the first operation than in the second operation. Therefore, in the first operation, a switching loss that occurs at the turn-on of the lower MOSFET 31 is small. Similarly, in the first operation, a switching loss that occurs at the turn-on of the lower MOSFET 33 at the start of the period of the state T4 is small.

Moreover, in the first operation, the lower MOSFET 31 is also turned on at the start of the period of the state T5, and the lower MOSFET 33 is also turned on at the start of the period of the state T2. Immediately before the timing at which the lower MOSFET 31 is turned on at the start of the period of the state T5, the current IL1 does not flow through the first sub-reactor 24. Moreover, at this time, the high current IL2 flows through the lower MOSFET 33. Accordingly, an increase rate of the current Ids in the lower MOSFET 31 (i.e., the current IL1) at this time is almost the same as an increase rate of the current IL2, and is much lower than that illustrated by the graph in the solid line in FIG. 7. Therefore, a switching loss that occurs at this time is small. Similarly, an increase rate of the current Ids at the turn-on of the lower MOSFET 33 (i.e., the current IL2) at the start of the period of the state T2 is much lower than that illustrated by the graph in the solid line in FIG. 7. Therefore, a switching loss that occurs at this time is small.

As described above, in the first operation, the soft switching is achieved on all of the timings at which the lower MOSFETs 31, 33 are turned on. Therefore, a switching loss can further be suppressed in the first operation than in the second operation.

Moreover, in both of the first and second operations, when the lower MOSFETs 31, 33 are turned on, the potential of the anode of each of the diodes 42, 44 decreases, and a reverse voltage is applied to the diodes 42, 44. When the voltage applied to each of the diodes 42, 44 is switched from a forward voltage to a reverse voltage, a recovery current (a reverse current flowing for a short time) flows through the diodes 42, 44. When the recovery current flows, a recovery loss (a type of switching loss) occurs in the diodes 42, 44.

As illustrated in FIG. 6, in the second operation, the potentials of the anodes of the diodes 42, 44 are lowered from a high potential (a potential higher than that of the high potential output wiring 14) to a low potential (a potential of the low potential wiring 16) at the transition from the state S4 to the state S1. In other words, the voltage applied to the diodes 42, 44 is switched from a forward voltage to a reverse voltage. Accordingly, a recovery loss occurs in the diodes 42, 44.

On the other hand, as mentioned above, no current flows through the diode 42 at the turn-on of the lower MOSFET 31 at the start of the period of the state T1 in the first operation, so no recovery loss occurs in the diode 42 at this time. Moreover, although the potential of the anode of the diode 44 is lowered via the first sub-reactor 24 and the second sub-reactor 26 due to the turn-on of the lower MOSFET 31 at the start of the period of the state T1, the potential of the anode of the diode 44 decreases at a low rate due to the influence of the induced voltages of the first sub-reactor 24 and the second sub-reactor 26. Therefore, a recovery loss hardly occurs in the diode 44 as well. Similarly, since no current flows through the diode 44 at the turn-on of the lower MOSFET 33 at the start of the period of the state T4, no recovery loss occurs in the diode 44 at this time. Moreover, since the potential of the anode of the diode 42 decreases gradually at the turn-on of the lower MOSFET 33 at the start of the period of the state T4 due to the influence of the induced voltages of the first sub-reactor 24 and the second sub-reactor 26, a recovery loss hardly occurs in the diode 42 as well.

As described above, a recovery loss (a type of switching loss) that occurs in the diodes 42, 44 can further be suppressed in the first operation than in the second operation.

Moreover, as mentioned above with reference to FIG. 3, in the first operation, only the lower MOSFET 31 is in the on state in the state T1, and only the lower MOSFET 33 is in the on state in the state T4. A steady loss $E_{on1}$ that occurs at the turn-on of only the lower MOSFET 31 (or 33) satisfies a relation of $E_{on1} \approx R_{on}IL^2$, where $R_{on}$ is an on-resistance of the lower MOSFET 31 (or 33). In contrast to this, as mentioned above with reference to FIG. 5, in the second operation, the lower MOSFETs 31, 33 are in the on state in the state S1, and there is no case where only one of the lower MOSFETs 31, 33 is in the on state. Accordingly, the current IL certainly divides to flow through the lower MOSFET 31 and the lower MOSFET 33. Therefore, a steady loss $E_{on2}$ that occurs at this time satisfies a relation of $E_{on2} \approx R_{on}(IL/2)^2 + R_{on}(IL/2)^2 = R_{on}IL^2/2$. That is, the steady loss $E_{on2}$ satisfies a relation of $E_{on2} \approx E_{on1}/2$. In other words, a steady loss is less likely to occur in the second operation than in the first operation.

Figure 8:
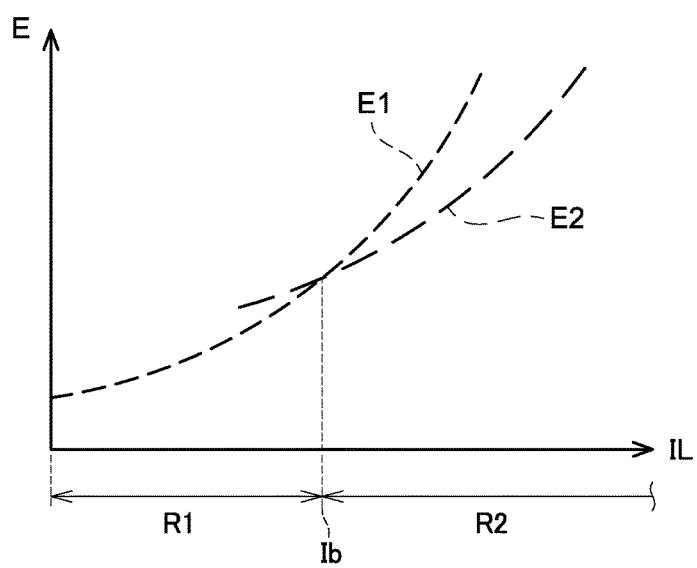
FIG. 8 is a graph illustrating a relation between a loss E and the current IL.

FIG. 8 illustrates a relation between a loss E and the current IL. It should be noted that the loss E illustrated in FIG. 8 indicates a total loss that occurs in the DC-DC converter 10. The loss E includes a steady loss and a switching loss. A graph E1 in FIG. 8 illustrates a loss that occurs in the first operation, and a graph E2 in FIG. 8 illustrates a loss that occurs in the second operation. As mentioned above, the first operation is highly effective to suppress a switching loss. In a current region R1 in which the current IL is small, a ratio of a switching loss relative to the total loss is large, so the loss E1 of the first operation which is highly effective to suppress a switching loss is smaller than the loss E2 of the second operation. Moreover, in a current region R2 in which the current IL is large, a ratio of a steady loss relative to the total loss is large, so the loss E2 of the second operation which is highly effective to suppress a steady loss is smaller than the loss E1 of the first operation. As mentioned above, the gate controller 54 performs the first operation when the current IL is lower than the threshold value Ith, and performs the second operation when the current IL is equal to or higher than the threshold value Ith. The threshold value Ith is set to satisfy a relation of 0.9×Ib<Ith<1.1×Ib, relative to a boundary value Ib between the current region R1 and the current region R2. In other words, the threshold value Ith is set to a value that is approximately equal to the boundary value Ib. Therefore, the DC-DC converter 10 in the first embodiment can perform the first operation in the current region R1, and perform the second operation in the current region R2. A loss that occurs in the DC-DC converter 10 is thus effectively suppressed. It should be noted that the current IL is a value within the current region R1 during normal driving of a vehicle, and becomes a value within the current region R2 in a case of abrupt acceleration of the vehicle and the like. Therefore, the DC-DC converter 10 performs the first operation during normal driving of a vehicle, and performs the second operation in the case of abrupt acceleration of the vehicle and the like.

As mentioned above, in the first operation according to the first embodiment, the lower MOSFET 33 is in the on state in a part (the period of the state T2) of the period (the periods of the states T1, T2) in which the lower MOSFET 31 is in the on state. Accordingly, a steady loss is suppressed in the first operation according to the first embodiment as compared to a case where only the lower MOSFET 31 is in the on state in an entirety of the periods of the states T1, T2. Similarly, in the first operation according to the first embodiment, the lower MOSFET 31 is in the on state in a part (the period of the state T5) of the period (the periods of the states T4, T5) in which the lower MOSFET 33 is in the on state. Accordingly, a steady loss is suppressed in the first operation according to the first embodiment as compared to a case where only the lower MOSFET 33 is in the on state in an entirety of the periods of the states T4, T5. In other words, in the first embodiment, a steady loss can further be suppressed in the first operation that achieves the soft switching than in conventional soft-switching technologies.

Figure 9:
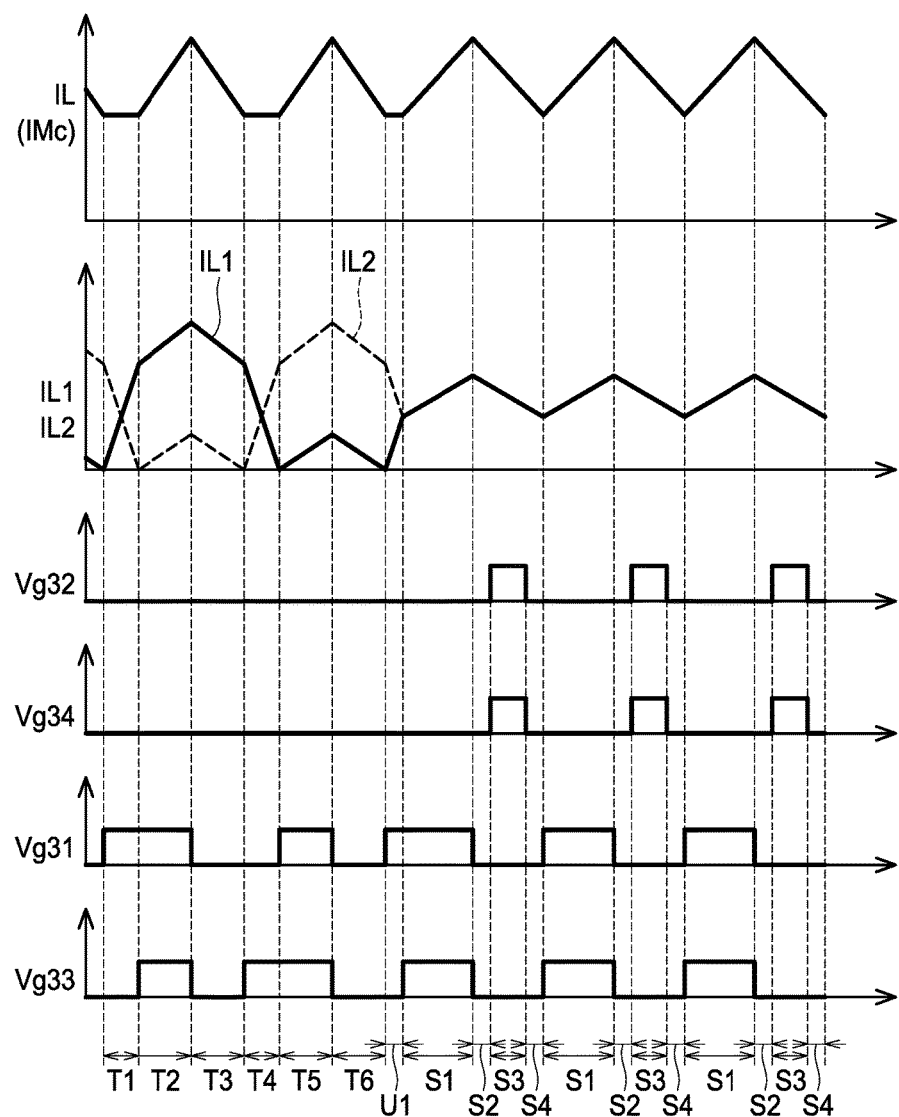
FIG. 9 is a graph illustrating changes in respective values at a transition from the first operation to the second operation by a transition method according to a first embodiment.

Next, a transition method from the first operation to the second operation will be described. In the first embodiment, when the current IL exceeds the threshold value Ith, the state T6 in the first operation transitions to the state S1 in the second operation. FIG. 9 illustrates a transition method according to the first embodiment, and FIG. 10 illustrates a transition method according to a comparative example.

Figure 10:
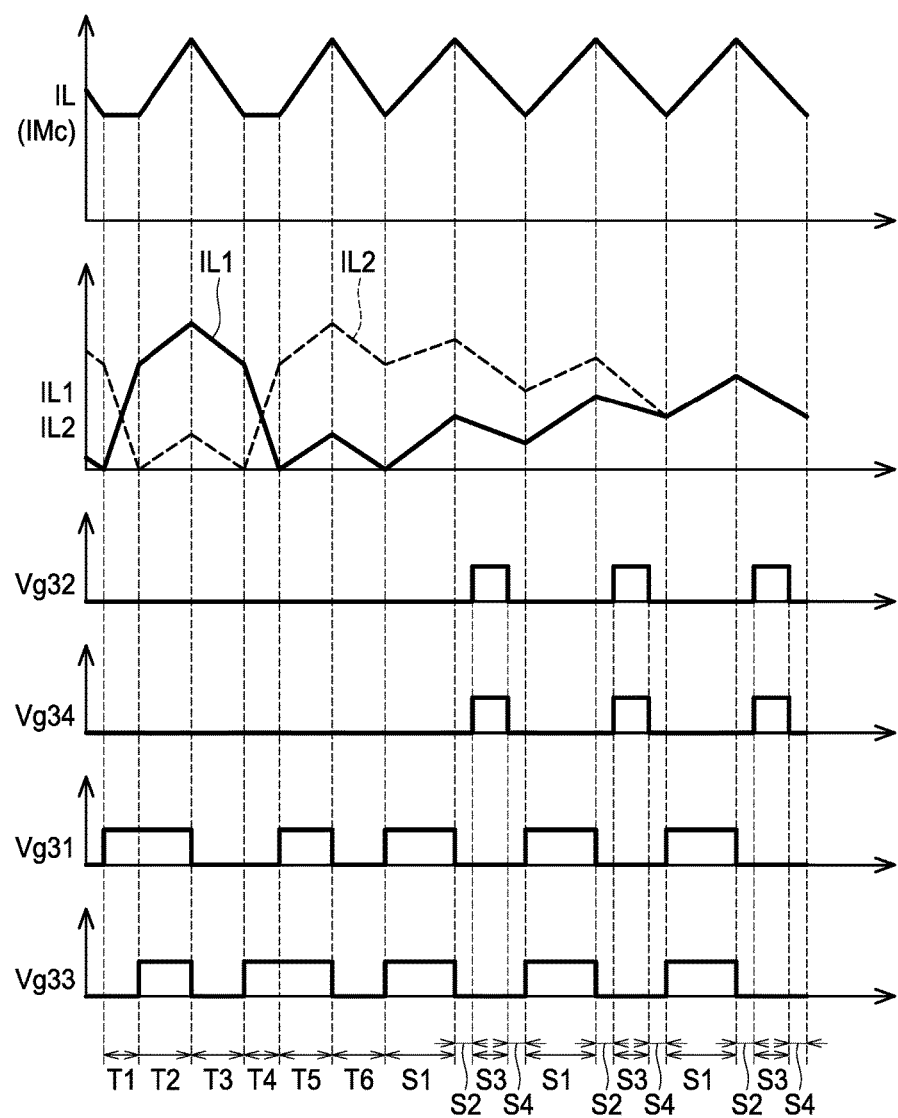
FIG. 10 is a graph illustrating changes in respective values at the transition from the first operation to the second operation by a transition method according to a comparative example.

In the transition method of the comparative example in FIG. 10, when the state T6 in the first operation transitions to the state S1 in the second operation, the lower MOSFET 31 and the lower MOSFET 33 are simultaneously turned on. As mentioned above, at a last timing of the state T6 in the first operation, the current IL1 is zero and the current IL2 has a relatively high value. In the comparative example, on this timing, the lower MOSFETs 31, 33 are simultaneously turned on to transition to the state S1 in the second operation. Then, the currents IL1, IL2 flow as illustrated in the state S1 in FIG. 6. At the start of the period of the state S1, values of the currents IL1, IL2 at the last timing of the state T6 are maintained, so the current IL2 is high and the current IL1 is zero. Thereafter, while the cycle of the states S1 to S4 is repeated plural times, the current IL1 increases with fluctuations and the current IL2 decreases with fluctuations. At a stage where the cycle of the states S1 to S4 has been repeated plural times, the current IL1 and the current IL2 become approximately equal. Since the first sub-reactor 24 and the second sub-reactor 26 inhibit drastic changes in the currents IL1, IL2, it takes a long time until the current IL1 and the current IL2 are balanced. While a current imbalance is present, a large steady loss occurs in the lower MOSFET 33 through which the high current IL2 flows. Accordingly, the total loss in the DC-DC converter 10 also becomes large.

In contrast to this, in the transition method of the first embodiment illustrated in FIG. 9, when the state T6 in the first operation transitions to the state S1 in the second operation, the lower MOSFET 31 is turned on first, and then the lower MOSFET 33 is turned on next. In other words, as illustrated in FIG. 9, in the transition method of the first embodiment, a short transition period U1 is provided between the period of the state T6 in the first operation and the period of the state S1 in the second operation. During the transition period U1, the lower MOSFET 31 is brought to the on state, and the lower MOSFET 33 is in the off state. In the transition period U1, as in the state T1 in FIG. 4, the current IL1 flows to the low potential wiring 16 via the lower MOSFET 31. Moreover, since the lower MOSFET 33 is off, the current IL2 flows to the high potential output wiring 14 via the diode 44. During the period U1, the current IL2 rapidly decreases, and the current IL1 rapidly increases. On a timing at which the current IL1 and the current IL2 become approximately equal, the lower MOSFET 33 is turned on, and the state S1 in the second operation starts. As described above, according to this transition method, the second operation can be started with the currents IL1, IL2 being balanced. Therefore, a steady loss can further be suppressed than in the transition method of the comparative example. It should be noted, at the start of the second operation, the lower MOSFET 33 may be turned on when the current IL1 and the current IL2 are detected and become equal, or on a preset timing (e.g., on a timing after a predetermined time has elapsed since the turn-on of the lower MOSFET 31).

In the first embodiment mentioned above, the current sensor 52 measures the current IL flowing through the main reactor 22. However, a current sensor that detects a current flowing through another position (e.g., at least one of the high potential input wiring 12, the first sub-reactor 24, the second sub-reactor 26, the MOSFETs 31 to 34, and the diodes 41 to 44) may be provided, and the current IL may be estimated from a detection value from the current sensor and the first and second operations may be switched based thereon.

Moreover, the first and second operations of the first embodiment may be applied to a regenerative operation of the DC-DC converter (an operation of charging the direct current source 90 by using surplus power of the high potential output wiring 14). In this case, the upper MOSFETs 32, 34 can be soft-switched by the first operation.

Second Embodiment

Figure 11:
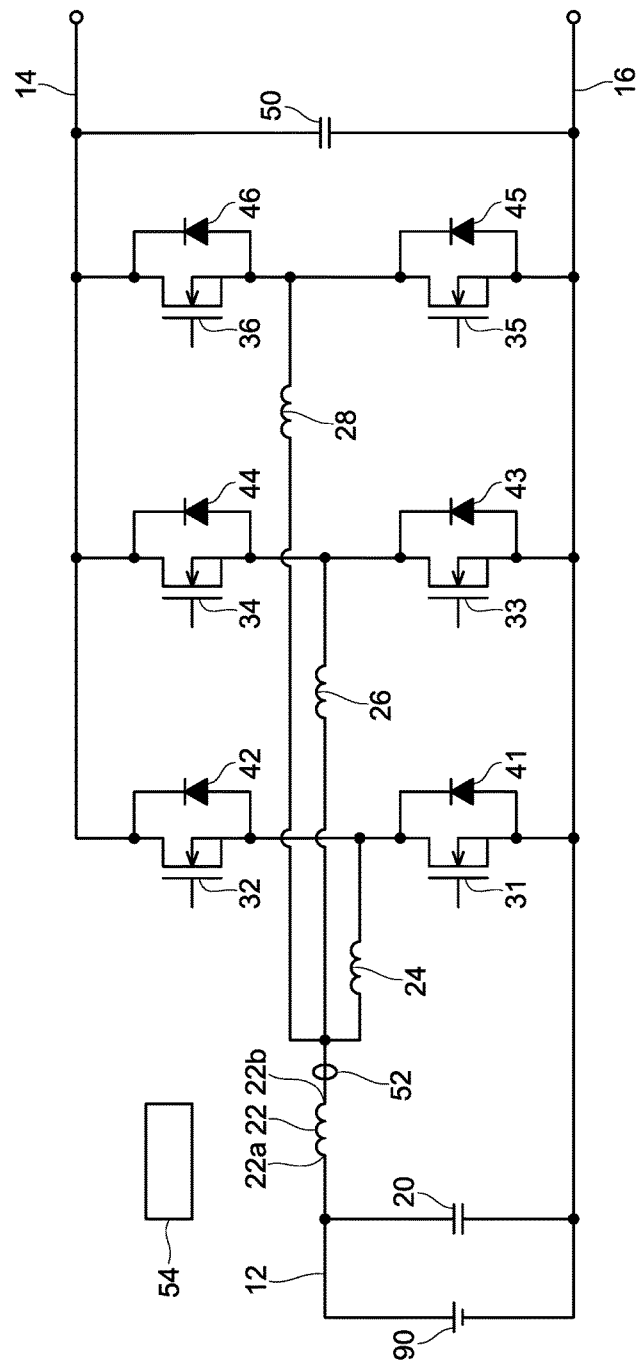
FIG. 11 is a circuit diagram of a DC-DC converter according to a second embodiment.
Figure 12:
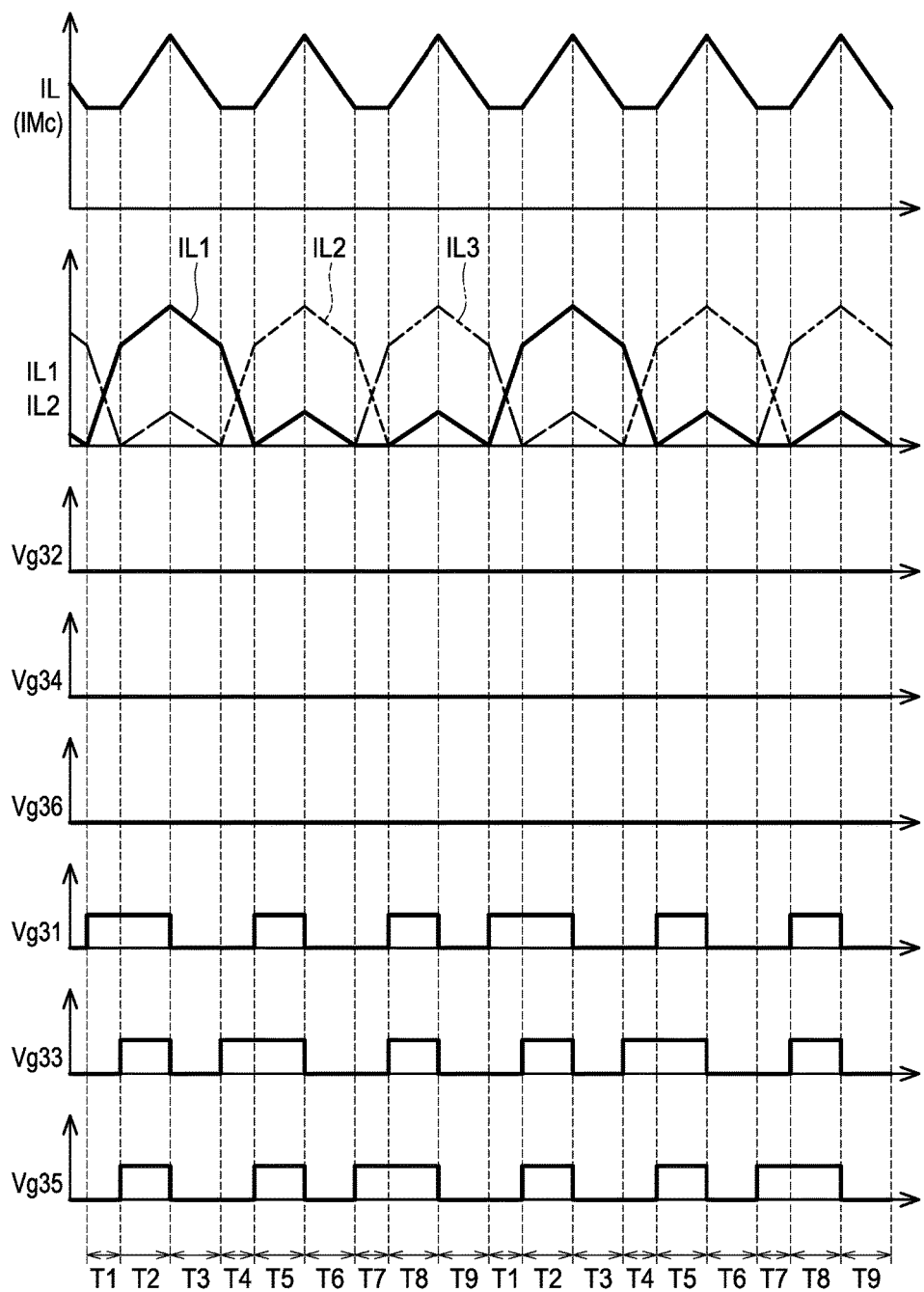
FIG. 12 is a graph illustrating changes in respective values in a first operation according to the second embodiment.

Next, a second embodiment will be described. In the second embodiment, as illustrated in FIG. 11, a lower MOSFET 35, a diode 45, an upper MOSFET 36, a diode 46, and a third sub-reactor 28 are added. The MOSFETs 35, 36 are of n-channel type. A source of the lower MOSFET 35 is connected to the low potential wiring 16, a source of the upper MOSFET 36 is connected to a drain of the lower MOSFET 35, and a drain of the upper MOSFET 36 is connected to the high potential output wiring 14. One end of the third sub-reactor 28 is connected to the second terminal 22b of the main reactor 22, and other end of the third sub-reactor 28 is connected to the drain of the lower MOSFET 35 and the source of the upper MOSFET 36. An anode of the diode 45 is connected to the source of the lower MOSFET 35, and a cathode of the diode 45 is connected to the drain of the lower MOSFET 35. An anode of the diode 46 is connected to the source of the upper MOSFET 36, and a cathode of the diode 46 is connected to the drain of the upper MOSFET 36. In this case, as illustrated in FIG. 12, in a first operation, the state of the DC-DC converter 10 can be controlled so as to be changed in an order from a state T1 to a state T9, and then return to the state T1. In other words, a cycle of the states T1 to T9 may be performed repeatedly. Moreover, the number of series circuits each including an upper MOSFET and a lower MOSFET may further be increased as compared to the number illustrated in FIG. 11.

Third Embodiment

Figure 13:
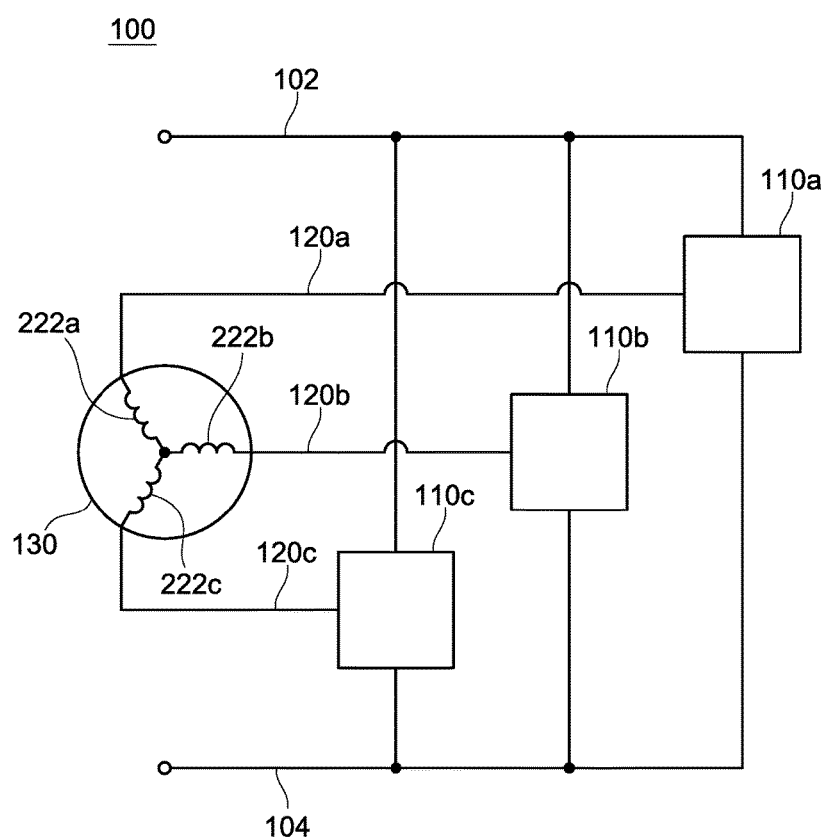
FIG. 13 is a circuit diagram of an inverter.

In the first and second embodiments, the DC-DC converter has been described. In contrast to this, in a third embodiment, description will be made on an example in which the technology disclosed herein is applied to an inverter. An inverter 100 illustrated in FIG. 13 includes a high potential wiring 102 and a low potential wiring 104. The high potential wiring 102 is connected to a plus side of a direct current source (e.g., a positive electrode of a battery, a high potential output wiring of a DC-DC converter, or the like). The low potential wiring 104 is connected to a minus side of the direct current source (e.g., a negative electrode of the battery, a low potential wiring of the DC-DC converter, or the like). Three switching circuits 110a, 110b, 110c are connected in parallel between the high potential wiring 102 and the low potential wiring 104. One end of each of motor wirings 120a, 120b, 120c is connected to a corresponding one of the switching circuits 110a, 110b, 110c. Other end of each of the motor wirings 120a, 120b, 120c is connected to a drive motor (a three-phase motor) 130. The drive motor 130 includes three coils 222a, 222b, 222c. The motor wiring 120a is connected to the coil 222a, the motor wiring 120b is connected to the coil 222b, and the motor wiring 120c is connected to the coil 222c. The inverter 100 converts direct current power that is applied between the high potential wiring 102 and the low potential wiring 104 into three-phase alternating current power, and supplies the three-phase alternating current power to the drive motor 130.

Next, the switching circuits 110a, 110b, 110c will be described. It should be noted that the switching circuits 110a, 110b, 110c include configurations identical to one another, and thus the switching circuit 110c will hereinafter be described.

Figure 14:
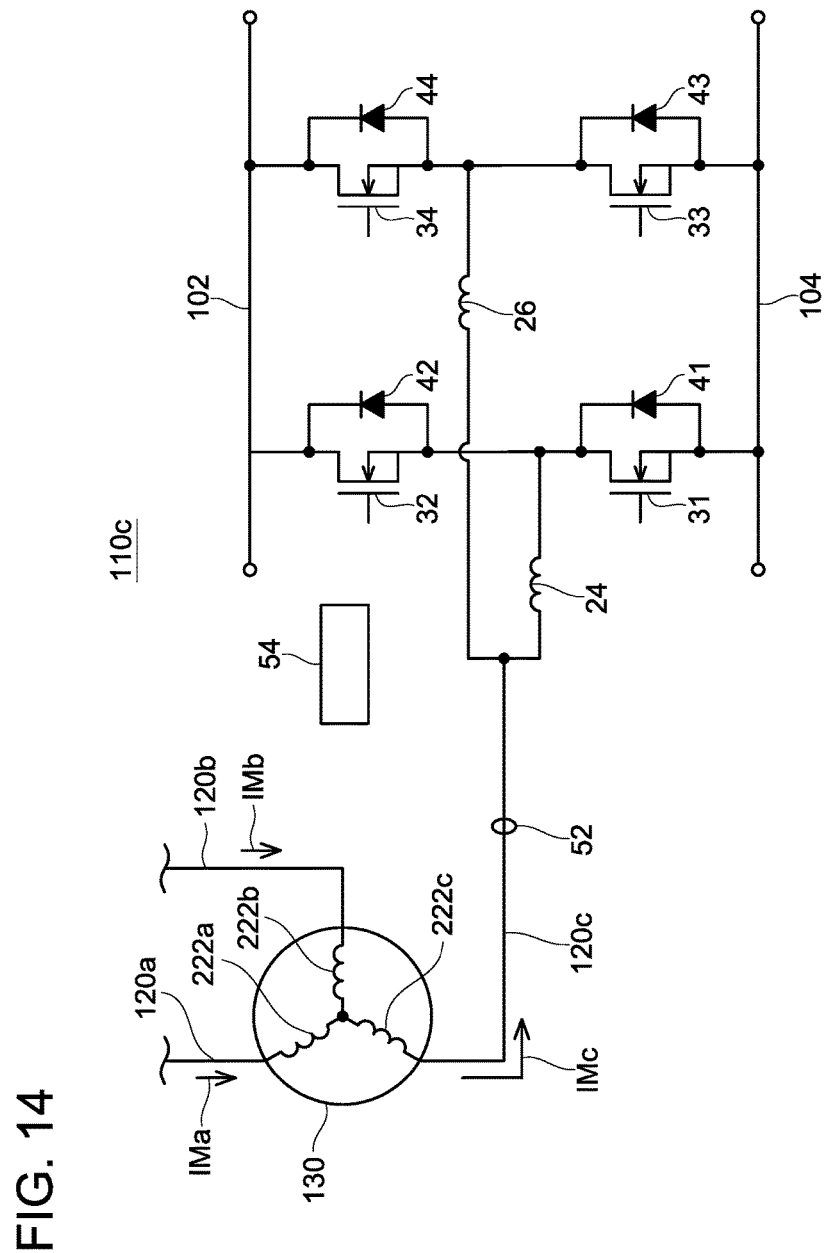
FIG. 14 is a circuit diagram of a switching circuit.

FIG. 14 illustrates the switching circuit 110c. It should be noted that constituent elements of the switching circuit 110c that correspond to the constituent elements of the DC-DC converter according to the first and second embodiments will hereinafter be denoted with the same reference numbers as those in the first and second embodiments. The switching circuit 110c includes the MOSFETs 31 to 34. Between the high potential wiring 102 and the low potential wiring 104, the upper MOSFET 32 and the lower MOSFET 31 are connected in series, and the upper MOSFET 34 and the lower MOSFET 33 are connected in series. The diodes 41 to 44 are connected in parallel to the MOSFETs 31 to 34, respectively. In each of the diodes 41 to 44, the anode thereof is connected to the source of the corresponding MOSFET, and the cathode thereof is connected to the drain of the corresponding MOSFET. Moreover, the switching circuit 110c includes the first sub-reactor 24 and the second sub-reactor 26. One end of the first sub-reactor 24 is connected to the drain of the lower MOSFET 31, and other end of the first sub-reactor 24 is connected to the motor wiring 120c. One end of the second sub-reactor 26 is connected to the drain of the lower MOSFET 33, and other end of the second sub-reactor 26 is connected to the motor wiring 120c. The motor wiring 120c is provided with the current sensor 52. Moreover, the switching circuit 110c includes the gate controller 54 connected to the gates of the MOSFETs 31 to 34.

Each of the switching circuits 110a to 110c switches the MOSFETs therein, and thereby alternating current power is supplied to the drive motor 130. Each of currents IMa, IMb, IMc in FIG. 14 indicates a current flowing through the drive motor 130. FIG. 14 illustrates a case where the current IMa flows from the motor wiring 120a to the coil 222a, the current IMb flows from the motor wiring 120b to the coil 222b, and the current IMc flows from the coil 222c to the motor wiring 120c. The current IMc is a current obtained by adding the current IMa and the current IMb. In a state where the currents IMa, IMb, IMc flow as such, the gate controller 54 controls the current IMc by switching the MOSFETs 31 to 34. The gate controller 54 performs a first operation when the current IMc detected by the current sensor 52 is lower than the threshold value Ith, and performs a second operation when the current IMc is equal to or higher than the threshold value Ith.

Figure 15:
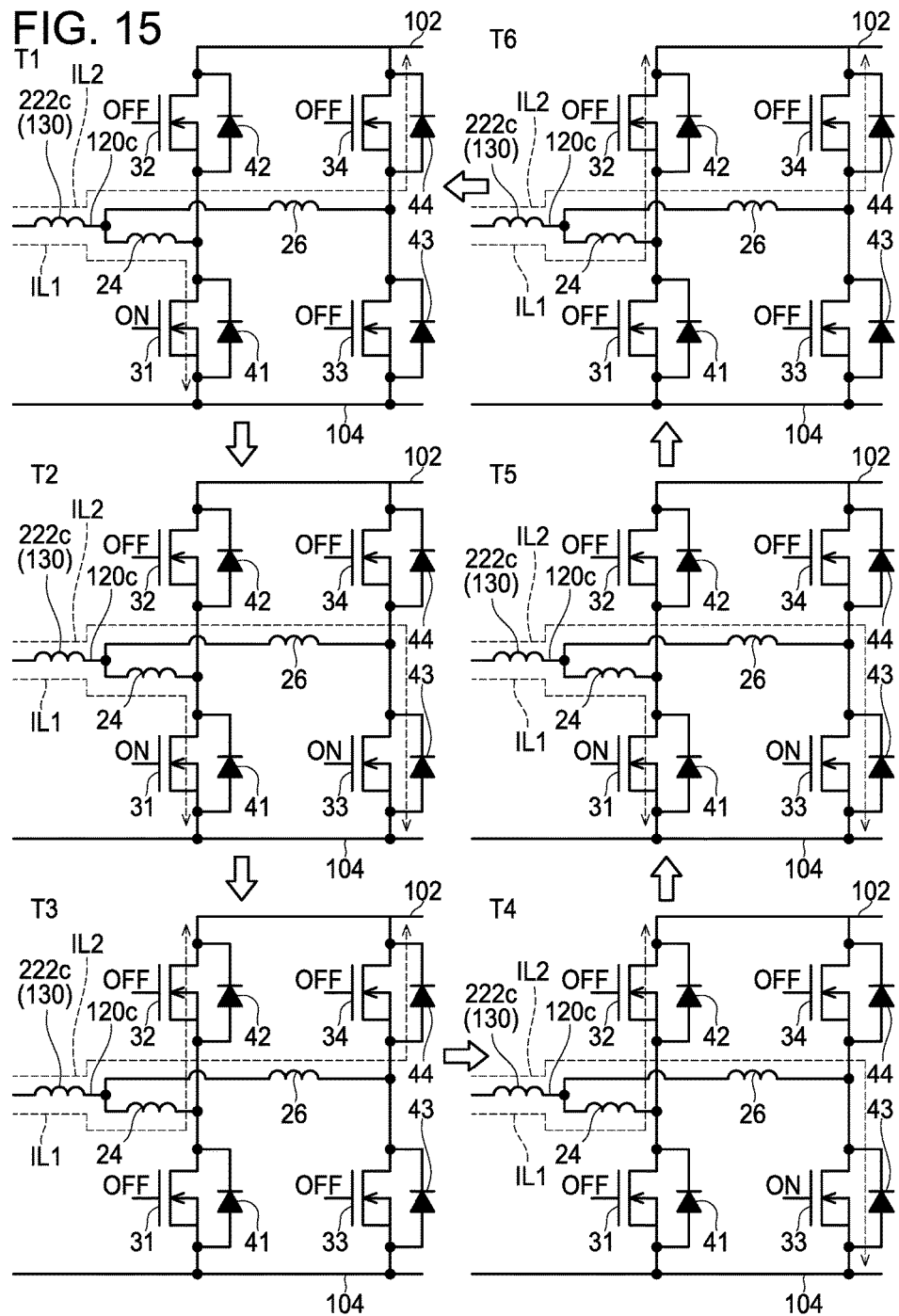
FIG. 15 is a diagram illustrating changes in a state of the switching circuit in a first operation.
Figure 16:
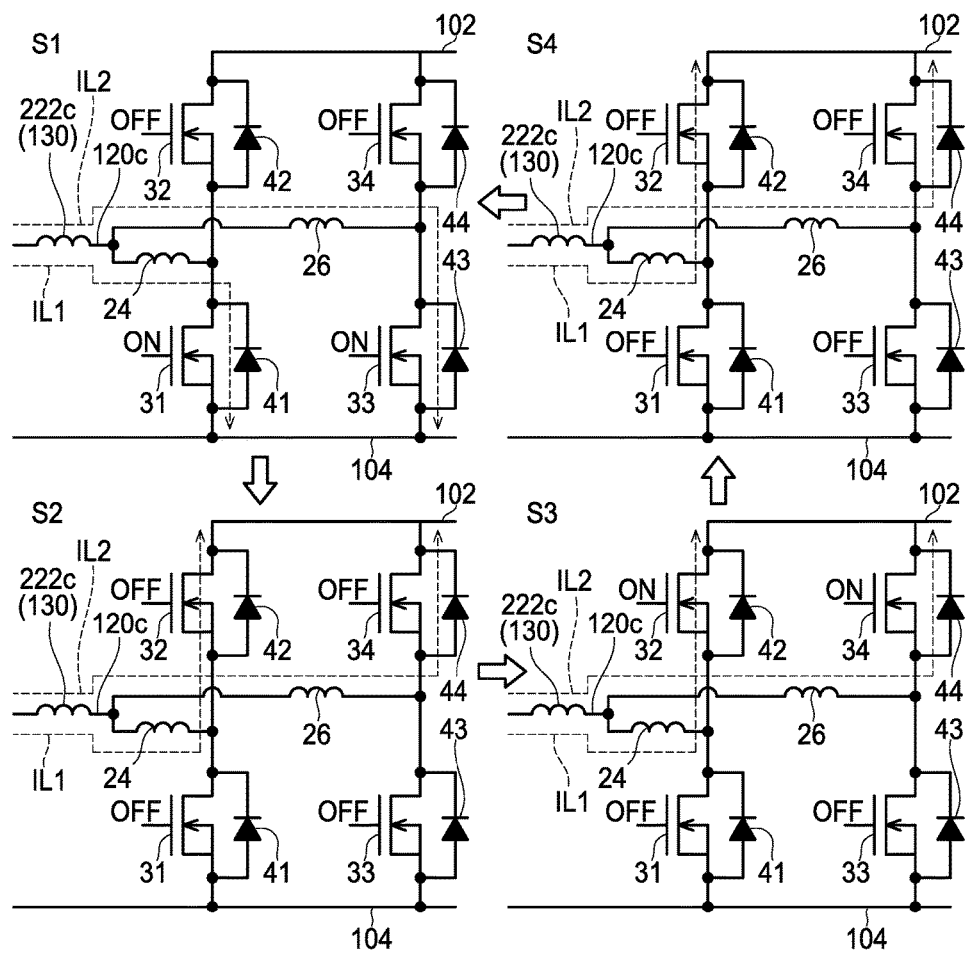
FIG. 16 is a diagram illustrating changes in the state of the switching circuit in a second operation.

The first operation and the second operation of the switching circuit 110c are approximately identical to the first operation in FIG. 3 and the second operation in FIG. 5. It should be noted, for the switching circuit 110c, FIGS. 3 and 5 illustrate the current IMc instead of the current IL. FIG. 15 illustrates states T1 to T6 of the switching circuit 110c. Moreover, FIG. 16 illustrates states S1 to S4 of the switching circuit 110c. It should be noted that each of FIGS. 15 and 16 illustrates the circuit configuration of the switching circuit 110c in a more simplified manner than FIG. 14 does.

The first operation of the switching circuit 110c illustrated in FIG. 15 is approximately identical to the first operation of the DC-DC converter 10 illustrated in FIG. 4. In the state T1, the current IL1 flows through the lower MOSFET 31 in the on state. Moreover, in the state T1, the current IL2 flows through the diode 44. It should be noted that the current IL2 decreases to zero during the period of the state T1. In the state T2, the lower MOSFET 33 is turned on, and the current thereby divides to the lower MOSFET 31 and the lower MOSFET 33. In the state T3, the lower MOSFETs 31, 33 are turned off, and the currents IL1, IL2 flow through the diodes 42, 44. In the state T4, the lower MOSFET 33 is turned on, and the current IL2 flows through the lower MOSFET 33. Moreover, in the state T4, the current IL1 continues flowing through the diode 42. It should be noted that the current IL1 decreases to zero during the period of the state T4. In the state T5, the lower MOSFET 31 is turned on, and the current thereby divides to the lower MOSFET 31 and the lower MOSFET 33. In the state T6, the lower MOSFETs 31, 33 are turned off, and the currents IL1, IL2 flow through the diodes 42, 44. When the currents IL1, IL2 flow through the lower MOSFETs 31, 33, the current IMc flowing through the drive motor 130 increases. When the currents IL1, IL2 flow through the diodes 42, 44, the currents IL1, IL2 flow backward, and the current IMc decreases. Therefore, by controlling a duty ratio of the on state of the lower MOSFET 31 and the on state of the lower MOSFET 33 in the first operation, it is possible to control the current IMc flowing through the drive motor 130.

As is clear from FIGS. 3 and 15, in the first operation of the switching circuit 110c, the current IL1 flowing through the first sub-reactor 24 is zero immediately before the timing at which the lower MOSFET 31 is turned on. Therefore, the lower MOSFET 31 can be soft-switched. Moreover, in the first operation of the switching circuit 110c, the current IL2 flowing through the second sub-reactor 26 is zero immediately before the timing at which the lower MOSFET 33 is turned on. Therefore, the lower MOSFET 33 can be soft-switched. Accordingly, a switching loss is reduced. Moreover, since the lower MOSFET 33 is on in a part (the period of the state T2) of the period in which the lower MOSFET 31 is on, the current divides and a steady loss is reduced. Moreover, since the lower MOSFET 31 is on in a part (the period of the state T5) of the period in which the lower MOSFET 33 is on, the current divides and a steady loss is reduced.

The second operation of the switching circuit 110c illustrated in FIG. 16 is approximately identical to the second operation of the DC-DC converter 10 illustrated in FIG. 6. In the state S1, the currents IL1, IL2 flow through the lower MOSFETs 31, 33 in the on state. Moreover, in the states S2 to S4, the currents IL1, IL2 flow through the diodes 42, 44. When the currents IL1, IL2 flow through the lower MOSFETs 31, 33, the current IMc flowing through the drive motor 130 increases. When the currents IL1, IL2 flow through the diodes 42, 44, the currents IL1, IL2 flow backward, and the current IMc decreases. Therefore, by controlling a duty ratio of the on state of the lower MOSFET 31 and the on state of the MOSFET 33 in the second operation, it is possible to control the current IMc flowing through the drive motor 130.

As is clear from FIGS. 5 and 16, in the second operation of the switching circuit 110c, the current disperses to flow through the lower MOSFETs 31, 33. Therefore, a steady loss can further be reduced in the second operation than in the first operation.

In the switching circuit 110c according to the third embodiment, the first operation is performed in a low-current period during which the ratio of a switching loss is high, and the second operation is performed in a high-current period during which the ratio of a steady loss is high. Accordingly, a loss that occurs in the switching circuit 110c can be suppressed.

In the switching circuit 110c, a transition from the first operation to the second operation can be performed by the transition method illustrated in FIG. 9. In this transition method, when the state T6 in the first operation transitions to the state S1 in the second operation, the lower MOSFET 31 is turned on first, and then the lower MOSFET 33 is turned on next. In other words, the transition period U1 is provided between the period of the state T6 and the period of the state S1. In the transition period U1, the lower MOSFET 31 is brought into the on state, and the lower MOSFET 33 is in the off state. Accordingly, during the transition period U1, the currents IL1, IL2 flow as shown in the state T1 in FIG. 15. During the period U1, the current IL1 increases and the current IL2 decreases. Therefore, during the period U1, the current IL1 and the current IL2 become approximately equal. Accordingly, the second operation can be started with the current IL1 and the current IL2 being balanced. Due to this, a loss caused by an imbalance between the current IL1 and the current IL2 is suppressed.

It should be noted, in the switching circuit 110c of the third embodiment, the number of the MOSFETs, the diodes, and the sub-reactors may be increased as in FIG. 11. Moreover, in the switching circuit 110c as well, its configuration may be modified and applied as in the first and second embodiments.

Moreover, the first and second operations of the third embodiment may be applied to an operation when the current IMc flows from the switching circuit 110c to the coil 222c of the drive motor 130. In this case, the upper MOSFETs 32, 34 can be soft-switched by the first operation.

Relations between the constituent elements in the embodiments and constituent elements in the claims will be described. The direct current source 90 in the first and second embodiments is an example of a power source in the claims. The circuits that supplies the currents IMa, IMb to the drive motor 130 in the third embodiment (i.e., the switching circuits 110*a*, 110*b* connected to the motor wirings 120*a*, 120*b*) are examples of the power source in the claims. The high potential input wiring 12 in the first and second embodiments and the motor wirings 120*a*, 120*b* in the third embodiments are examples of a first high potential wiring in the claims. The high potential output wiring 14 in the first and second embodiments and the high potential wiring 102 in the third embodiment are examples of a second high potential wiring in the claims. The lower MOSFET 31 in the first to third embodiments is an example of a first FET in the claims. The lower MOSFET 33 in the embodiments is an example of a second FET in the claims. The diode 42 in the embodiments is an example of a first diode in the claims. The diode 44 in the embodiments is an example of a second diode in the claims. The main reactor 22 in the first and second embodiments, and the coil 222*c* in the third embodiment are examples of a main reactor in the claims. The states T1, T2 in the first to third embodiments are examples of a first period in the claims. The state T3 in the first to third embodiments is an example of a second period in the claims. The states T4, T5 in the first to third embodiments are examples of a third period in the claims. The state T6 in the first to third embodiments is an example of a fourth period in the claims. The state S1 in the first to third embodiments is an example of a fifth period in the claims. The states S2 to S4 in the first to third embodiments are examples of a sixth period in the claims.

Some of the technical features disclosed herein will be listed below. It should be noted that the respective technical elements are independent of one another, and are useful solely or in combinations.

In an example of the power conversion circuit disclosed herein, the gate controller may be configured to perform a second operation. The gate controller may be configured to perform the first operation during a period in which a current flowing through the main reactor is lower than a threshold value, and to perform the second operation during a period in which the current flowing through the main reactor is equal to or higher than the threshold value. In the second operation, the gate controller may control the first FET and the second FET so as to satisfy a condition that a fifth period in which the first FET and the second FET are on alternates with a sixth period in which the first FET and the second FET are off. A transition from the first operation to the second operation may be performed so that the fifth period follows the fourth period. The gate controller may turn on the first FET prior to the second FET at a start of the fifth period following the fourth period.

In the fourth period, no current flows through the first sub-reactor, and a current flows through the second sub-reactor. Accordingly, if the first and second FETs are turned on simultaneously at a subsequent transition to the second operation, a current flows more through the second FET and a current does not flow through the first FET much. Consequently, a current imbalance occurs between the first and second FETs, and a steady loss in the second FET is increased. In contrast to this, by the first FET being turned on prior to the second FET at the transition from the first operation to the second operation (i.e., at the start of the fifth period following the fourth period), the current imbalance can be eliminated promptly. In other words, when the first FET is turned on prior to the second FET, a current flowing through the first FET increases while the second FET is off, and a current flowing through the second reactor decreases. Thereafter, when the second FET is turned on, the current flowing through the second reactor (i.e., the decreased current) flows through the second FET. The current flowing through the first FET increases and the decreased current flows through the second FET, so the current flowing through the first FET and the current flowing through the second FET is likely to be balanced promptly. Therefore, according to this configuration, a steady loss at the start of the second operation can be suppressed.

While specific examples of the present invention have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

What is claimed is:

1. A power conversion circuit, comprising:
a first high potential wiring connected to a power source;
a second high potential wiring;
a low potential wiring;
a first FET of n-channel type, a source of the first FET being connected to the low potential wiring;
a second FET of n-channel type, a source of the second FET being connected to the low potential wiring;
a first diode, an anode of the first diode being connected to a drain of the first FET, and a cathode of the first diode being connected to the second high potential wiring;
a second diode, an anode of the second diode being connected to a drain of the second FET, and a cathode of the second diode being connected to the second high potential wiring;
a main reactor comprising a first terminal and a second terminal, the first terminal being connected to the first high potential wiring;
a first sub-reactor, one end of the first sub-reactor being connected to the second terminal of the main reactor, and other end of the first sub-reactor being connected to the drain of the first FET;
a second sub-reactor, one end of the second sub-reactor being connected to the second terminal of the main reactor, and other end of the second sub-reactor being connected to the drain of the second FET; and
a gate controller connected to a gate of the first FET and a gate of the second FET,
wherein
the gate controller is configured to perform a first operation,
in the first operation, the gate controller controls the first FET and the second FET so as to satisfy following conditions:
a first period, a second period, a third period, and a fourth period repeatedly appear in this order, the first period being a period in which the first FET is on, the second period being a period in which the first FET and the second FET are off, the third period being a period in which the second FET is on, and the fourth period being a period in which the first FET and the second FET are off;
in the third period, a first current flowing through the first sub-reactor decreases to zero after a timing at which the second FET is turned on, and the first FET is turned on after or on a timing at which the first current decreases to zero; and in the first period, a second current flowing through the second sub-reactor decreases to zero after a timing at which the first FET is turned on, and the second FET is turned on after or on a timing at which the second current decreases to zero.

2. The power conversion circuit of claim 1, wherein
the gate controller is configured to perform a second operation, the gate controller is configured to perform the first operation during a period in which a current flowing through the main reactor is lower than a threshold value, and to perform the second operation during a period in which the current flowing through the main reactor is equal to or higher than the threshold value, in the second operation, the gate controller controls the first FET and the second FET so as to satisfy a condition that a fifth period in which the first FET and the second FET are on alternates with a sixth period in which the first FET and the second FET are off, a transition from the first operation to the second operation is performed so that the fifth period follows the fourth period, and the gate controller turns on the first FET prior to the second FET at a start of the fifth period following the fourth period.

* * * * *